United States Patent
Dayal et al.

(10) Patent No.: US 10,628,378 B2
(45) Date of Patent: Apr. 21, 2020

(54) REPLICATION OF SNAPSHOTS AND CLONES

(71) Applicant: Tintri by DDN, Inc., Santa Clara, CA (US)

(72) Inventors: Shobhit Dayal, San Francisco, CA (US); Gideon W. Glass, Los Altos, CA (US); Edward K. Lee, Dublin, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 590 days.

(21) Appl. No.: 14/472,834

(22) Filed: Aug. 29, 2014

(65) Prior Publication Data

US 2015/0066857 A1    Mar. 5, 2015

Related U.S. Application Data

(60) Provisional application No. 61/873,241, filed on Sep. 3, 2013.

(51) Int. Cl.
  *G06F 16/11*    (2019.01)

(52) U.S. Cl.
  CPC .................. *G06F 16/128* (2019.01)

(58) Field of Classification Search
  CPC ............................... G06F 17/30088
  See application file for complete search history.

(56) References Cited

U.S. PATENT DOCUMENTS

| 6,526,574 B1 | 2/2003 | Jones |
| 6,594,744 B1 | 7/2003 | Humlicek et al. |
| 7,809,759 B1 | 10/2010 | Bruso et al. |
| 8,463,825 B1 | 6/2013 | Harty et al. |

(Continued)

FOREIGN PATENT DOCUMENTS

| JP | 2009146389 | 7/2009 |
| JP | 2010191647 | 9/2010 |
| JP | 2012216025 | 11/2012 |

OTHER PUBLICATIONS

Author Unknown, "NetApp SnapRestore software uses stored Snapshot copies to recover entire file systems or data volumes in seconds.", http://www.netapp.com/us/products/protection-software/snaprestore.aspx.

(Continued)

*Primary Examiner* — Taelor Kim
*Assistant Examiner* — Dawaune A Conyers
(74) *Attorney, Agent, or Firm* — Van Pelt, Yi & James LLP

(57) ABSTRACT

Performing replication of snapshots between storage systems is disclosed. A request to store at a destination system a snapshot data to represent at the destination system a state of a set of data at a first point-in-time is received. A first source system snapshot data that represents at a source system the state of the set of data at the first point-in-time depends on a second source system snapshot data that represents at the source system a state of the set of data at a second point-in-time. The snapshot data to represent at the destination system the state of the set of data at the first point-in-time is determined based on data comprising the first source system snapshot data and a destination system snapshot data that represents at the destination system a state of the set of data at a third point-in-time.

25 Claims, 21 Drawing Sheets

(56) References Cited

U.S. PATENT DOCUMENTS

| | | | |
|---|---|---|---|
| 8,468,174 B1 | 6/2013 | Yueh | |
| 8,612,488 B1 | 12/2013 | Subramanya et al. | |
| 2002/0161781 A1* | 10/2002 | Leong | G06F 17/30607 707/103 |
| 2003/0120863 A1 | 6/2003 | Lee et al. | |
| 2003/0182292 A1* | 9/2003 | Leong | G06F 9/4435 707/769 |
| 2004/0030727 A1 | 2/2004 | Armangau et al. | |
| 2004/0267836 A1* | 12/2004 | Armangau | G06F 11/1435 707/203 |
| 2005/0188049 A1 | 8/2005 | Perret et al. | |
| 2006/0112151 A1 | 5/2006 | Manley et al. | |
| 2006/0235892 A1 | 10/2006 | Kalach et al. | |
| 2007/0043574 A1 | 2/2007 | Coffman et al. | |
| 2007/0055833 A1 | 3/2007 | Vu et al. | |
| 2007/0083567 A1 | 4/2007 | Arai | |
| 2007/0088729 A1 | 4/2007 | Baca | |
| 2007/0106706 A1 | 5/2007 | Ahrens et al. | |
| 2007/0208918 A1 | 9/2007 | Harbin et al. | |
| 2007/0260830 A1 | 11/2007 | Faibish et al. | |
| 2007/0271365 A1 | 11/2007 | Revanuru et al. | |
| 2007/0283111 A1 | 12/2007 | Berkowitz et al. | |
| 2008/0082593 A1 | 4/2008 | Komarov et al. | |
| 2008/0155223 A1 | 6/2008 | Hiltgen et al. | |
| 2008/0244028 A1 | 10/2008 | Le et al. | |
| 2009/0260007 A1 | 10/2009 | Beaty et al. | |
| 2009/0276774 A1 | 11/2009 | Kinoshita | |
| 2009/0307450 A1 | 12/2009 | Lee | |
| 2010/0023716 A1 | 1/2010 | Nemoto | |
| 2010/0070726 A1 | 3/2010 | Ngo et al. | |
| 2010/0122248 A1 | 5/2010 | Robinson et al. | |
| 2010/0257403 A1 | 10/2010 | Virk et al. | |
| 2010/0262617 A1* | 10/2010 | Shinjo | G06F 17/30625 707/769 |
| 2011/0035359 A1 | 2/2011 | Bendakovsky et al. | |
| 2011/0153697 A1 | 6/2011 | Nickolov et al. | |
| 2011/0320404 A1 | 12/2011 | Akulavenkatavara et al. | |
| 2012/0005672 A1 | 1/2012 | Cervantes et al. | |
| 2012/0005673 A1 | 1/2012 | Cervantes | |
| 2012/0011106 A1* | 1/2012 | Reid | G06F 9/466 707/695 |
| 2012/0016839 A1 | 1/2012 | Yueh | |
| 2012/0079221 A1* | 3/2012 | Sivasubramanian | G06F 11/1456 711/162 |
| 2012/0278799 A1 | 11/2012 | Starks | |
| 2012/0317079 A1 | 12/2012 | Shoens | |
| 2012/0323853 A1 | 12/2012 | Fries et al. | |
| 2012/0330964 A1 | 12/2012 | Baude et al. | |
| 2013/0262801 A1 | 10/2013 | Sancheti et al. | |
| 2014/0025872 A1 | 1/2014 | Flynn | |
| 2014/0052761 A1 | 2/2014 | Teitelbaum | |
| 2014/0089265 A1* | 3/2014 | Talagala | G06F 17/30551 707/674 |
| 2014/0095823 A1* | 4/2014 | Shaikh | G06F 12/02 711/165 |
| 2014/0136578 A1 | 5/2014 | Wood | |
| 2015/0339302 A1 | 11/2015 | Dwarampudi | |
| 2016/0188652 A1 | 6/2016 | Goo | |

OTHER PUBLICATIONS

Author Unknown, "rysnc—Wikipedia", accessed Jul. 23, 2013 version on Nov. 5, 2014 via the Internet Wayback Machine, https://web.archive.org/web/20120619201533/http://en.wikipedia.org/wiki/Rsync.

Martin Pool, "rdiff(1)—Linkux man page", accessed Jun. 29, 2012 version on Nov. 5, 2014 via the Internet Wayback Machine, https://web.archive.org/web/20120629053647/http://linux.die.net/man/1/rdiff.

Ben Escoto "rdiff-backup(1)—Linux man page", accessed Jul. 5, 2012 version on Nov. 5, 2014 via the Internet Wayback Machine, https://web.archive.org/web/20120705001700/http://linux.die.net/man/1/rdiff-backup.

U.S. Appl. No. 13/938,005, filed Jul. 9, 2013.

U.S. Appl. No. 14/202,836, filed Mar. 10, 2014.

Laverick et al., "Administering VMware View™ 4.5", Jan. 1, 2010, Retrieved from the Internet: URL: http://cdn.ttgtmedia.com/rms/pdf/view4.5-rtfm-guide-GAAE-1.pdf [retrieved on Aug. 5, 2016].

Ohad Rodeh, "B-trees, shadowing, and clones", ACM Transactions on Storage, vol. 3, No. 4, pp. 1-27, Feb. 1, 2008.

"Data Synchronization", Aug. 8, 2016, Techopedia, www.techopedia.com/definition/1006/data-synchronization.

"Data Synchronization", Aug. 8, 2016, Wikipedia, en.wikipedia.org/wiki/Data_synchronization.

U.S. Appl. No. 14/202,836, "Efficient Data Synchronization for Storage Containers", filed Mar. 10, 2014.

\* cited by examiner

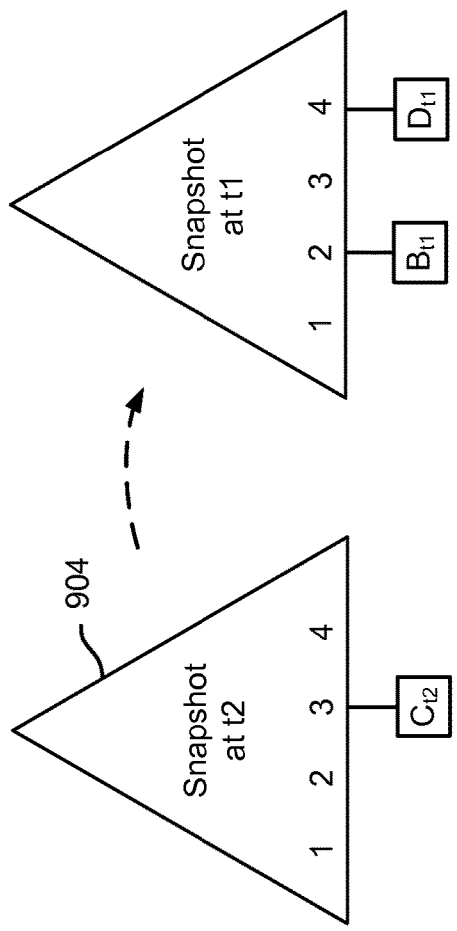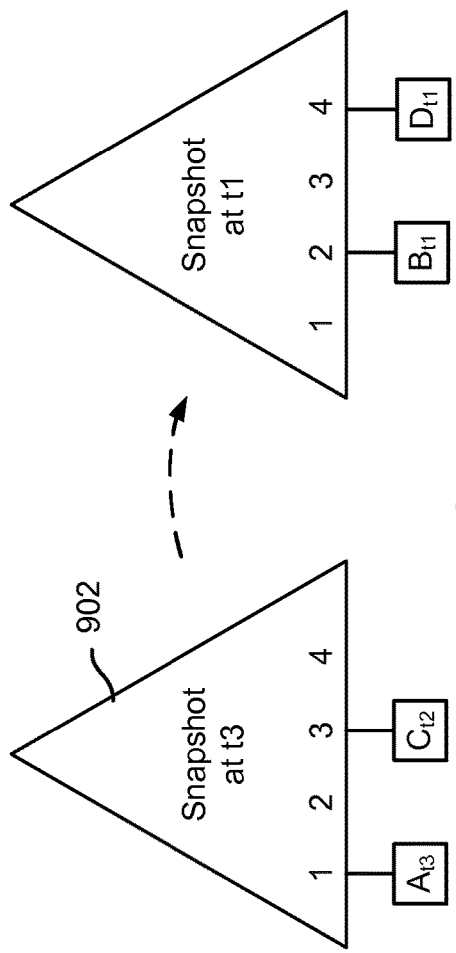
FIG. 9A

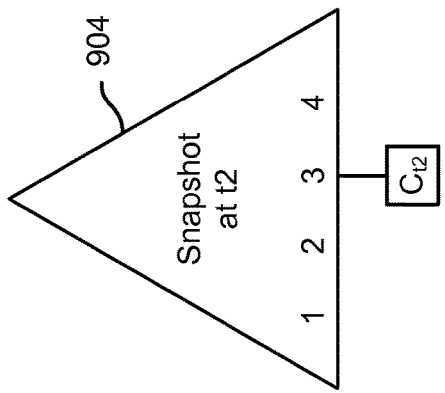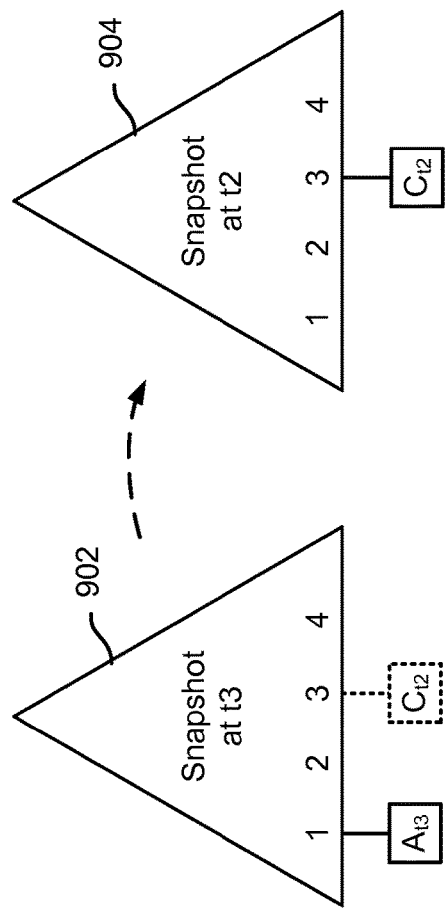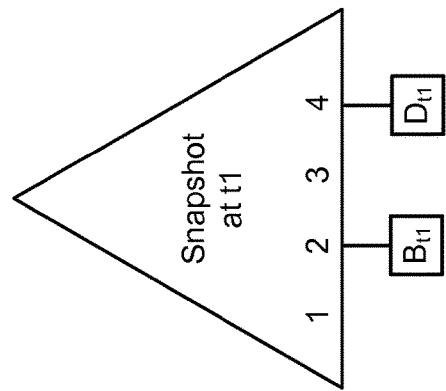
FIG. 9B

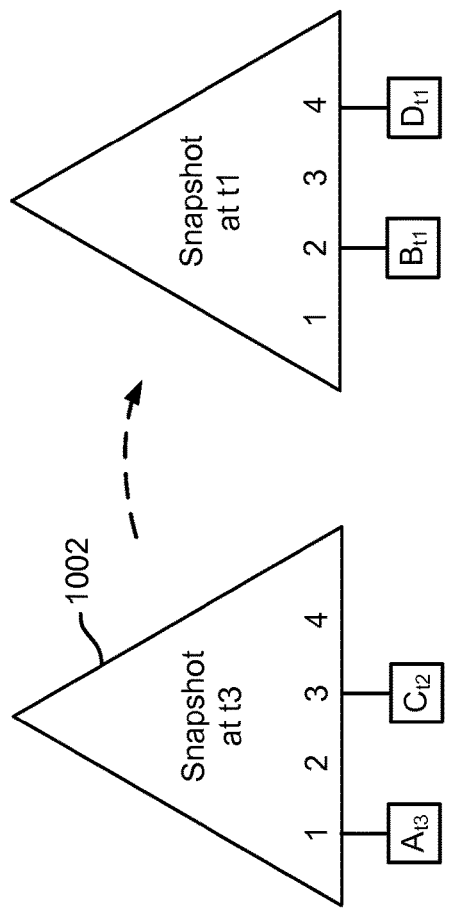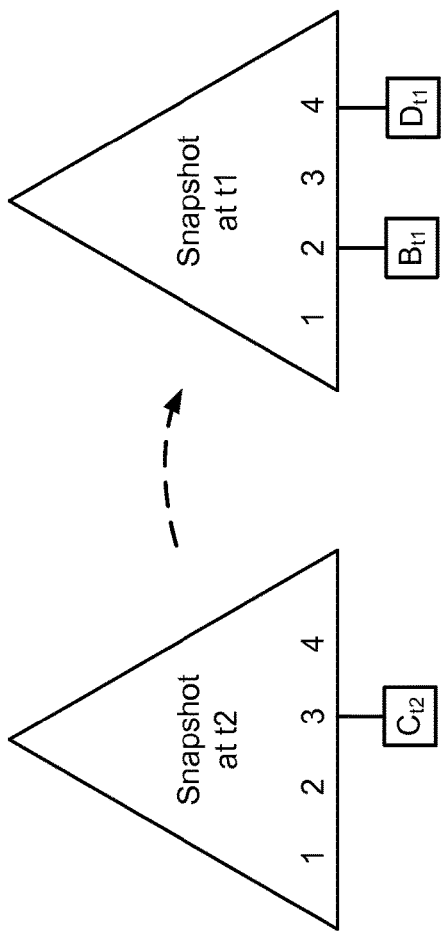
FIG. 10A

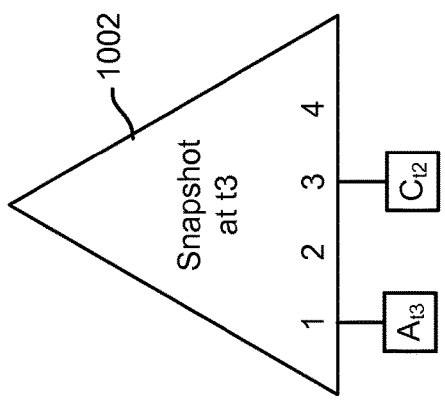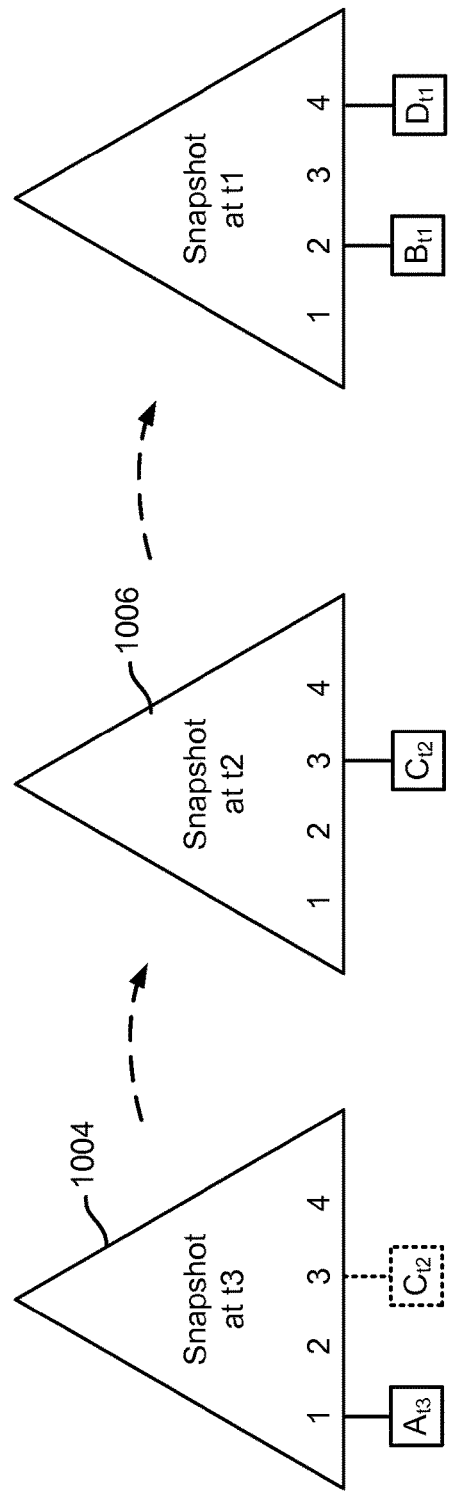
FIG. 10B

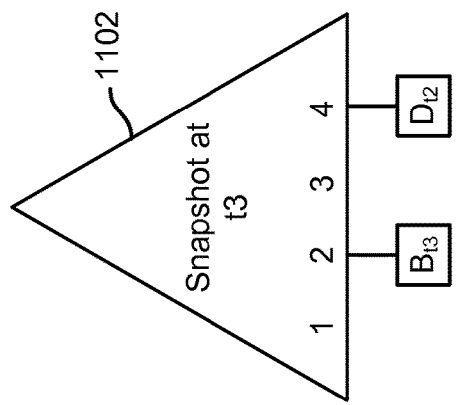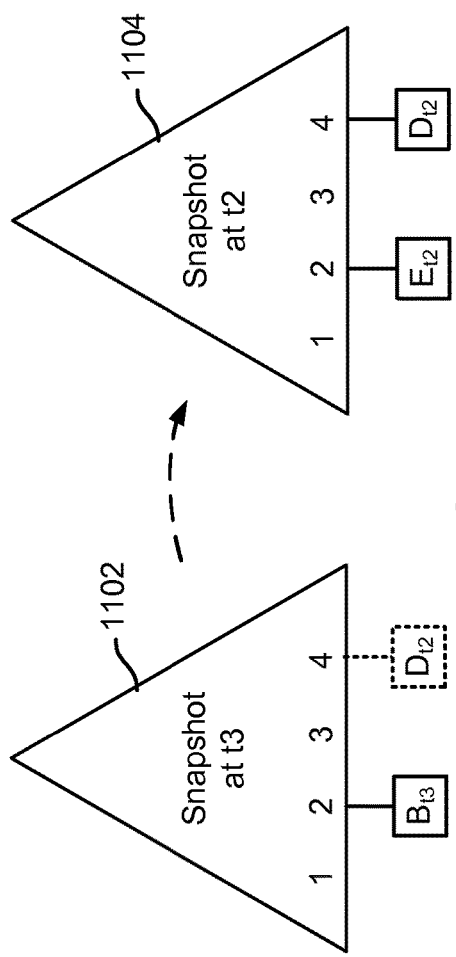
FIG. 11B

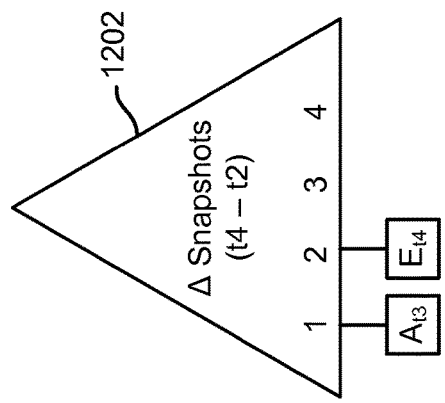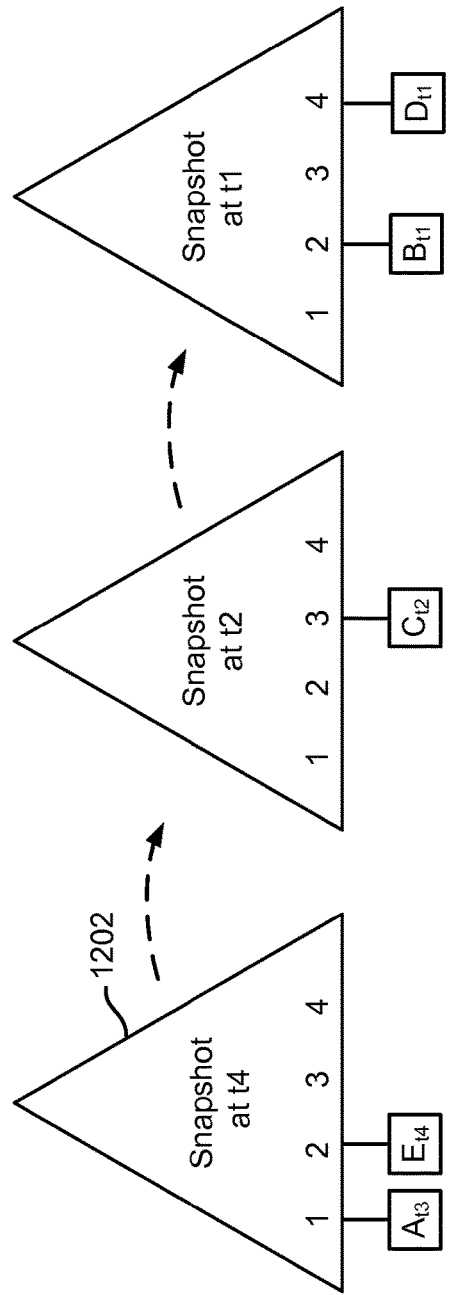
FIG. 12B

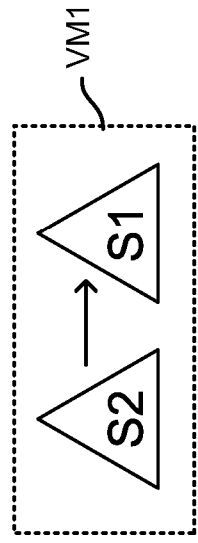
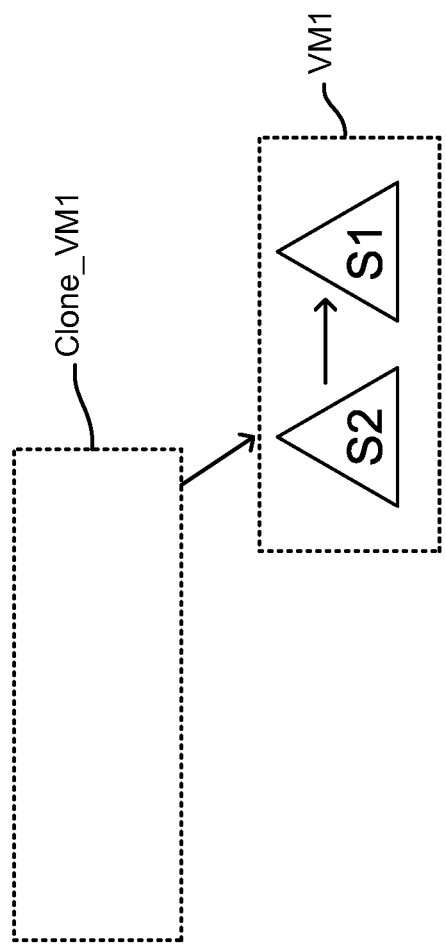
FIG. 15B

REPLICATION OF SNAPSHOTS AND CLONES

CROSS REFERENCE TO OTHER APPLICATIONS

This application claims priority to U.S. Provisional Patent Application No. 61/873,241 entitled REPLICATION OF SNAPSHOTS AND CLONES filed Sep. 3, 2013 which is incorporated herein by reference for all purposes.

BACKGROUND OF THE INVENTION

In some systems, a snapshot can be represented as a snapshot index that tracks the changes made to a storage system between two given points in time. When replicating a snapshot associated with a state of data at a point-in-time, many conventional approaches "expand" the state of the data at the point-in-time corresponding to the snapshot. The expanded state of the data contains all data values that exist or can be accessed at that point-in-time and is usually much larger than the delta representation, which only contains changes that have been made since the next older snapshot. Transmission to and storage of expanded states of data at a destination system can be inefficient.

BRIEF DESCRIPTION OF THE DRAWINGS

Various embodiments of the invention are disclosed in the following detailed description and the accompanying drawings.

FIGS. 9A and 9B are diagrams showing an example of replicating the snapshot at time t2 from a source system to a destination system.

FIGS. 10A and 10B are diagrams showing an example of replicating the snapshot at time t3 from a source system to a destination system.

FIGS. 11A and 11B are diagrams showing another example of replicating the snapshot at time t3 from a source system to a destination system.

FIGS. 12A and 12B are diagrams showing another example of replicating the snapshot at time t4 from a source system to a destination system.

FIGS. 15A, 15B, and 15C are diagrams showing an example of replicating a snapshot at time t4 (S4) associated with a clone from a source system to a destination system.

DETAILED DESCRIPTION

Figure 1:
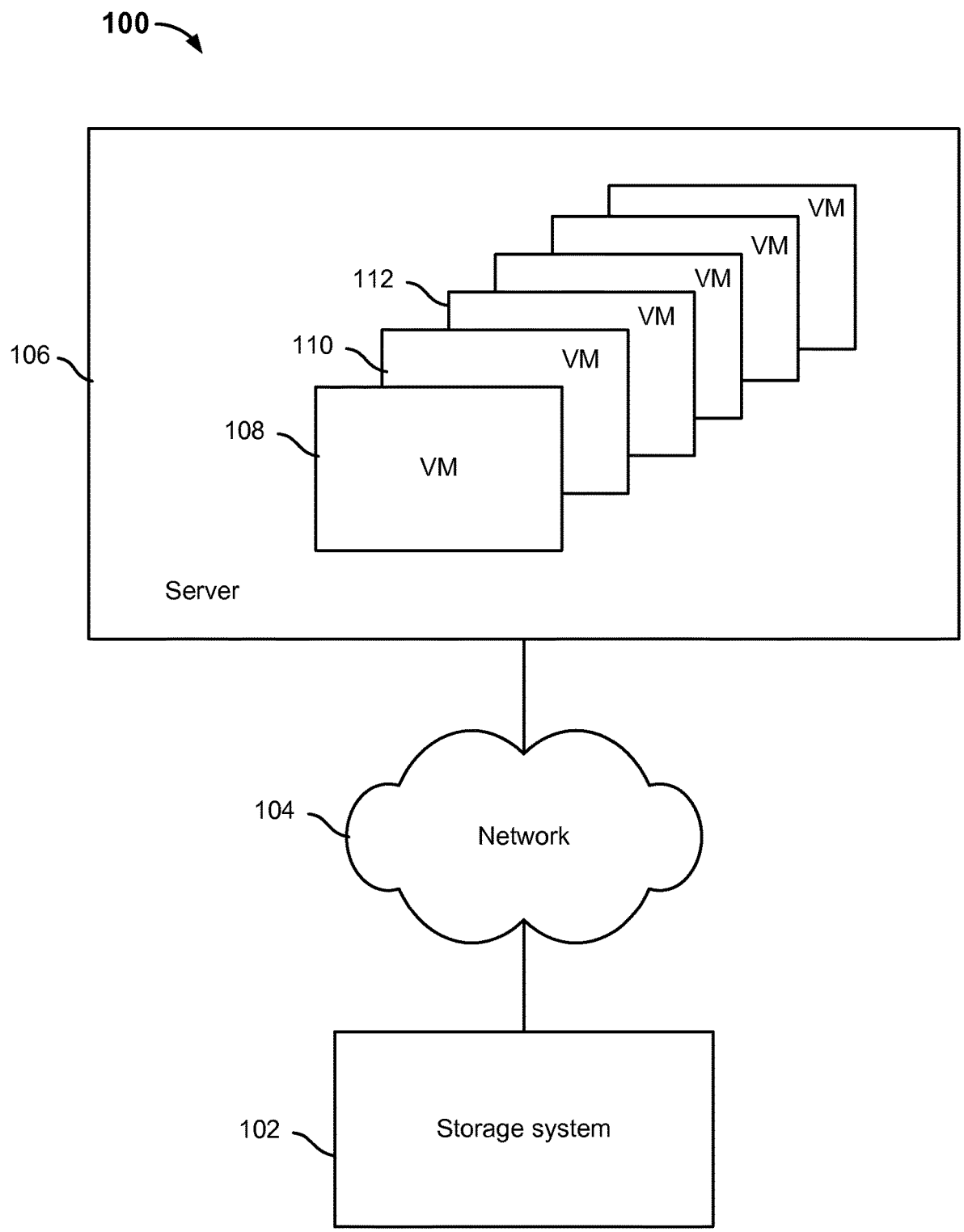
FIG. 1 is a diagram showing an embodiment of a storage system for the storage of VMs using virtual machine storage abstractions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of performing efficient, flexible replication of snapshots and clones between storage systems are described herein. Storage systems for which the replication of snapshots is performed may be located great distances apart from each other. Snapshots and clones allow space-efficient representation of point-in-time copies of data. Snapshots are generally read-only copies, while clones are generally copies that can be read or written to. Typical replication of snapshots and clones at a remote storage system often results in the loss of space efficiency or places restrictions on the subset or order in which snapshots and clones must be replicated. Embodiments described herein enable replicating snapshots and clones to be performed using a minimal amount of information, represented as changes or deltas, and to be transmitted and stored between the replicating storage systems. Any subset of snapshots and clones may be replicated in any order to any system, while preserving a minimal representation of data and metadata on the storage systems.

A "snapshot" comprises a point-in-time state of a set of data and in various embodiments, a subsequently generated snapshot includes mappings to data that was modified since the previous snapshot was created. A set of data may be associated with a virtual machine (also sometimes referred to as a "VM"), a virtual disk (also sometimes referred to as a "vdisk"), or a file, for example. In various embodiments, the metadata associated with a set of data (e.g., a VM, a vdisk, or a file) comprises one or more snapshots. In various embodiments, a snapshot associated with a point-in-time state of a set of data is physically represented/stored as an index at a storage system. As used herein, a "snapshot" is sometimes used to refer to a state of a set of data at a particular point-in-time and/or the physical representation (e.g., an index) that represents that state of the set of data at that particular point-in-time at a particular storage system. A "user" performs read operations on a snapshot using "logical offsets," which are mapped to "physical offsets" using the indices associated with the snapshots comprising the set of data. The physical offsets can then be used to read and write data from the underlying physical storage devices. Read operations lookup the logical offset in one or more indices to find the corresponding physical offset, while write operations create new entries or update existing entries in indices. Because each snapshot index includes mappings to data modified since the immediately previously generated (i.e., older) snapshot index, each snapshot index (other than the oldest snapshot index) associated with the set of data may depend on (e.g., point to, link to, and/or otherwise reference) at least a next older snapshot index. As such, snapshots associated with different points-in-time states of the set of data can be represented as a sequence of snapshot indices at a storage system. Due to the dependencies among snapshot indices in a sequence, as will be described in further detail below, different storage systems with the same points-in-time snapshots associated with the same set of data may store indices that map somewhat different sets of logical offsets to correspond to their respective sequences of snapshots.

In various embodiments, a "clone" refers to a copy of an existing set of data (the existing set of data is sometimes referred to as "source data"). In various embodiments, a clone is generated from a snapshot of the source data. In various embodiments, the snapshot of the source data from which a clone is created is referred to as a "shared snapshot." To generate the clone, a new set of metadata is created and data associating the clone's new set of metadata to the source data's set of metadata is stored such that at least some of the snapshot indices associated with the source data are to be shared with the new set of metadata associated with the clone and at least some of the data associated with source data is shared with the clone.

FIG. 1 is a diagram showing an embodiment of a storage system for the storage of VMs using virtual machine storage abstractions. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the file system for the storage of VMs using virtual machine storage abstractions does not include network 104, and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM.

Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, storage system 102 is configured to store meta-information identifying which stored data objects, such as files or other virtual machine storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either disk or flash, or a combination of disk and flash.

Figure 2:
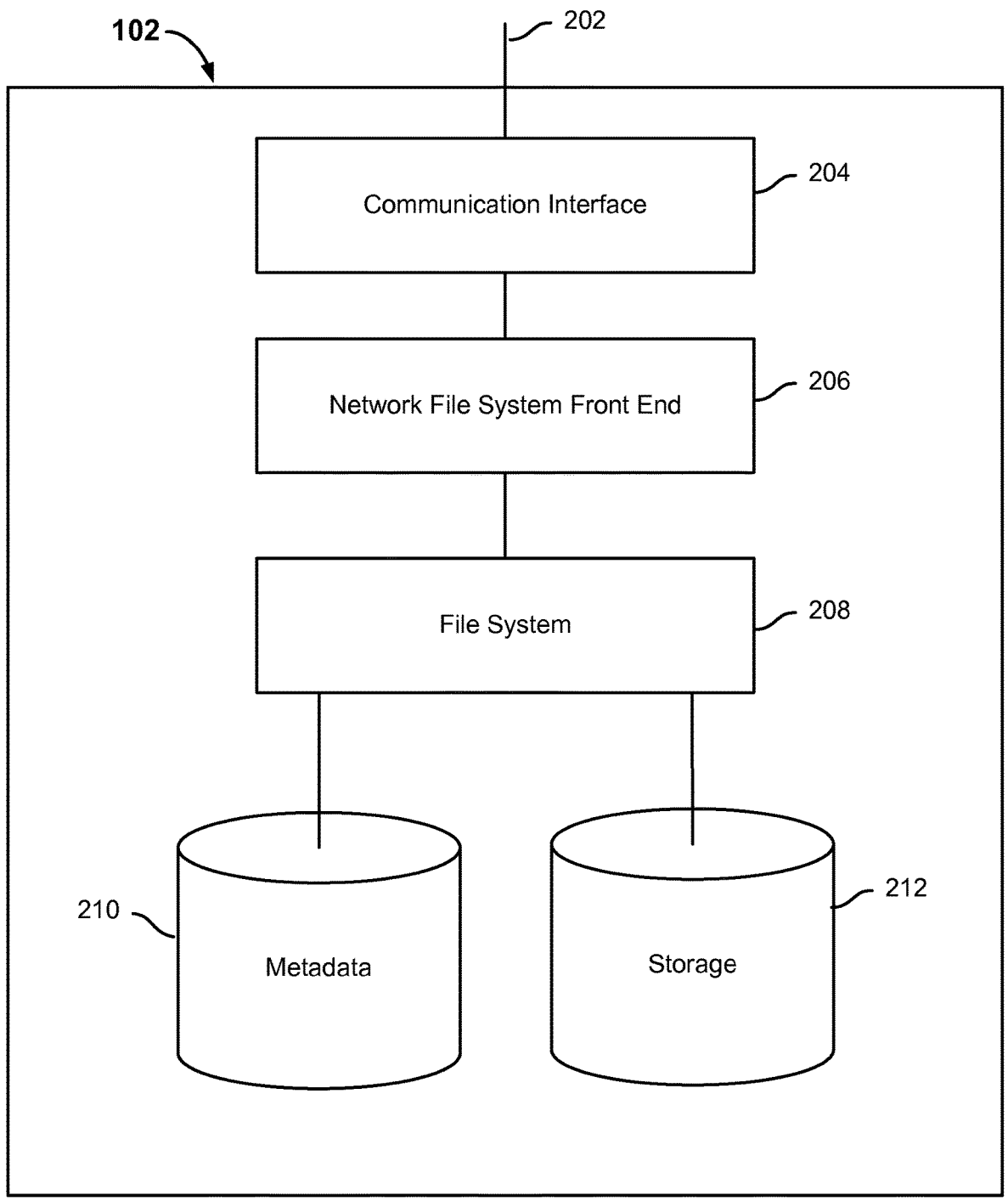
FIG. 2 is a block diagram illustrating an embodiment of a storage system including data and metadata.

FIG. 2 is a block diagram illustrating an embodiment of a storage system including data and metadata. In the example shown, storage system 102 includes a network connection 202 and a communication interface 204, such as a network interface card or other interface, which enable the storage system to be connected to and communicate via a network such as network 104 of FIG. 1. The storage system 102 further includes a network file system front end 206 configured to handle NFS requests from virtual machines running on systems such as server 106 of FIG. 1. In various embodiments, the network file system front end is configured to associate NFS requests as received and processed with a corresponding virtual machine and/or vdisk with which the request is associated, for example, using meta-information stored on storage system 102 or elsewhere. The storage system 102 includes a file system 208 configured and optimized to store VM data. In the example shown, metadata 210 is configured to store sets of metadata associated with various sets of data and their associated snapshots and clones. For example, a set of metadata may be associated with a VM, a vdisk, or a file. Storage 212 may comprise at least one tier of storage. In some embodiments, storage 212 may comprise at least two tiers of storage, where the first tier of storage comprises flash or other solid state disk (SSD) and the second tier of storage comprises a hard disk drive (HDD) or other disk storage.

In various embodiments, a set of metadata stored at metadata 210 includes at least one index that includes mappings to locations in storage 212 at which a set of data (e.g., VM, vdisk, or file) associated with the set of metadata is stored. In some embodiments, a set of metadata stored at metadata 210 includes at least an index that is a snapshot associated with a set of data stored in storage 212. In various embodiments, a set of metadata stored at metadata 210 includes a sequence of one or more snapshot indices associated with a set of data stored in storage 212, where each snapshot index (physically) depends on at least an older (i.e., an earlier generated) snapshot index, if one exists.

A clone may be generated based on an existing (or source) set of data stored in storage 212. In various embodiments, the clone may be generated using a snapshot of the source set of data in the source data's set of metadata that is stored in metadata 210. In various embodiments, the snapshot of the source data from which a clone is generated is referred to as a "shared snapshot." A new set of metadata is created for the clone and data associating the clone (and/or the clone's set of metadata) with the set of metadata associated with the (e.g., shared snapshot of the) source data is stored at metadata 210. At least some of the metadata associated with the source data is shared with the clone. In various embodiment, when a received request includes an operation (e.g., read or write) to access (e.g., a current state or to a past state of) data from a set of data (e.g., a VM, a vdisk, or a file), the set of metadata associated with that data is retrieved. In the event that the data associated with the request comprises a clone, then in some instances, at least a portion of the set of metadata associated with the source data may be accessed as well.

Figure 3:
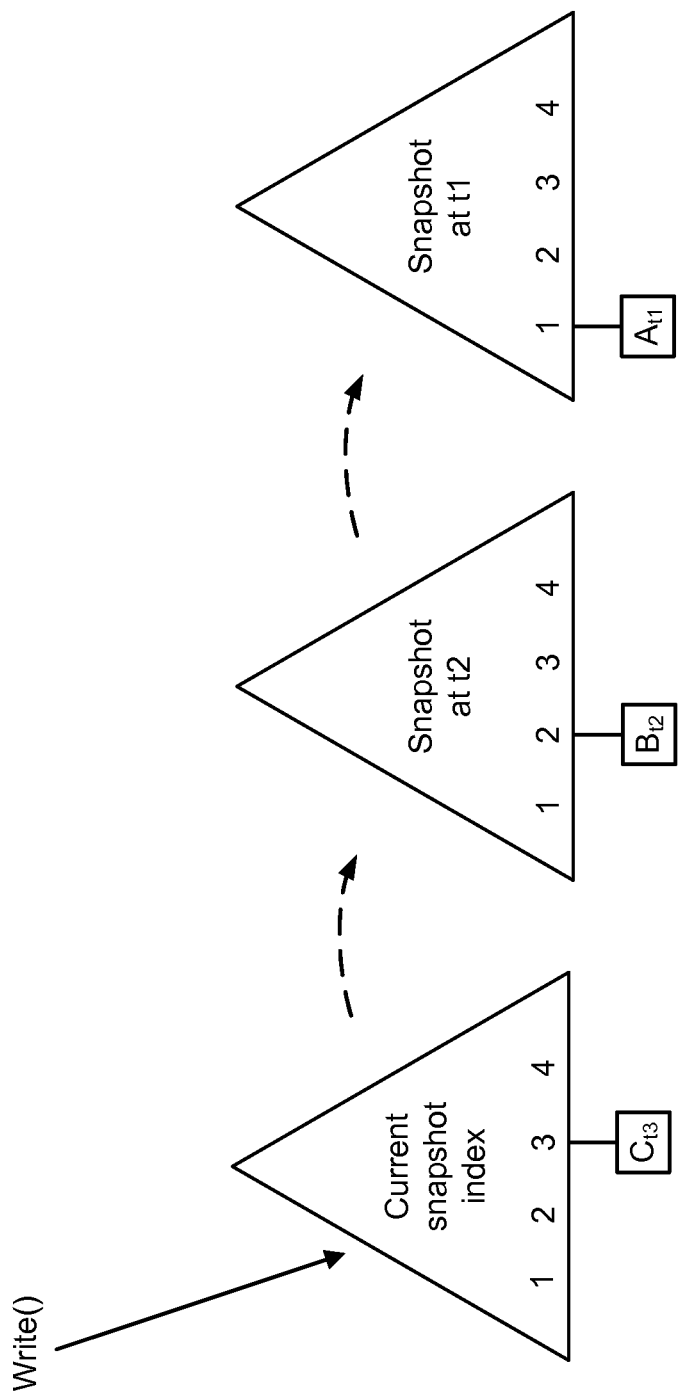
FIG. 3 is a diagram showing an example of a set of metadata associated with a set of data.

FIG. 3 is a diagram showing an example of a set of metadata associated with a set of data. A set of metadata may be associated with a set of data (e.g., a VM, a vdisk, or a file). In the example of FIG. 3, assume that the set of metadata is associated with a file. In the example, the set of metadata includes a current snapshot index, a snapshot at time t2, and a snapshot at time t1. The current snapshot index depends on (e.g., is linked to) the snapshot at time t2 and the snapshot at time t2 depends on (e.g., is linked to) the snapshot at time t1. In the example, data associated with the file may be stored at offsets 1, 2, 3, and 4.

Metadata may be thought of as the mapping used to translate a logical location (e.g., a logical offset) to a physical location (e.g., a physical offset) of underlying storage for data that a user may have written. In various embodiments, the metadata may be organized as an efficient index data structure such as a hash table or a B-tree. For example, the relationship between a logical offset of a data, the index, and the physical offset of the data may be described as follows: logical-offset→INDEX→physical-offset.

In various embodiments, each set of metadata includes at least one active index: the "current snapshot index." The current snapshot index is active in the sense that it can be modified. In some embodiments, the current snapshot index stores all offsets in the file that have been mapped since the previous snapshot was created. A snapshot is typically a read-only file, but the current snapshot index is modifiable until the next prescribed snapshot creation event occurs. For example, a prescribed snapshot creation event may be configured by a user and may comprise the elapse of an interval of time, the detection of a particular event, or a receipt of a user selection to create a new snapshot. Once the next prescribed snapshot creation event is reached, the state of the current snapshot index is preserved to create a new snapshot and a new empty current snapshot index is created. In some embodiments, write operations to the set of data result in the update of the current snapshot index. In some embodiments, read operations of the set of data result in the search of a current snapshot index and subsequently, a search through the sequence of snapshots if the desired data is not found in the current snapshot index. In various embodiments, each index is searched in a prescribed manner.

In some embodiments, a snapshot of a file is the point-in-time state of the file at the time the snapshot was created. A snapshot of a VM is the collection of file-level snapshots of files that comprise the VM. In some embodiments, at a storage system, a snapshot is represented as an index that stores mappings to the data that was modified after the previous snapshot was created. In other words, in some embodiments, each snapshot only includes the updates to a file (i.e., deltas) for a given time period (since the creation of the previous snapshot). As a result, the snapshot may be represented by a compact space-efficient structure.

When a snapshot is created, the current snapshot index becomes the index of that snapshot, and a new empty current snapshot index is created in preparation for the next snapshot. Each snapshot is linked to (or otherwise physically dependent on) the next younger and next older snapshot. In some embodiments, the links that go backward in time (i.e., the links to the next older snapshots) are traversed during snapshot and clone read operations.

Returning to the example of FIG. 3, the current snapshot index is linked (e.g., points to) the snapshot at time t2 and the snapshot at time t2 is linked to the snapshot at time t1. As shown in the example of FIG. 3, each of the snapshot at time t2 and the snapshot at time t1 is represented by a corresponding index. The snapshot at time t1 can be referred to as being "older" than the snapshot at time t2 and snapshot at time t2 can be referred to as being "younger" than the snapshot at time t1 because time t1 is earlier than time t2. Because the snapshot at time t2 is linked to the snapshot at time t1, the snapshot at time t2 and the snapshot at time t1 can be referred to as a chain or sequence of snapshots associated with the file. In some embodiments, each snapshot index of the set of metadata associated with the file is associated with a stored "file global ID" that identifies that the sequence of snapshots belongs to the file. Read operations to the current state of the file can be serviced from the current snapshot index and/or the snapshot at time t2 and the snapshot at time t1, while write operations to the file update the current snapshot index. In the example of FIG. 3, data A is written before time t1 at offset 1 and then the snapshot at time t1 is created. The data B is written before time t2 and after time t1 at offset 2 and then the snapshot at time t2 is created. The data value C is written after time t2, at time t3 at offset 3 and tracked in the current snapshot index. For example, if a new data value D (not shown) is to overwrite the data currently at offset 3, data value C, at time t4, then offset 3 of the current snapshot index would be updated to map to data value D.

In various embodiments, a read operation on a specified snapshot for a logical block offset may proceed in the following manner: First, a lookup of the specified snapshot index is performed for the logical block offset of the read operation. If a mapping exists, then data is read from the physical device (underlying storage) at the corresponding physical address and returned. Otherwise, if the mapping does not exist within the specified snapshot index, the link to the next older snapshot is traversed and a search of this older snapshot's index is performed. This process continues until a mapping for the logical block offset is found in a snapshot index or the last snapshot in the chain has been examined. For example, assume that a read operation to the set of data requests current data associated with offset 1. First, the current snapshot index of the set of data is searched for a mapping to data associated with offset 1. The mapping is not found in the current snapshot index, so the link (e.g., the stored associating data) from the current snapshot index to the snapshot at time t2 is traversed and a search of the snapshot at time t2 is performed. The mapping is not found in the snapshot at time t2, so the link from the snapshot at time t2 to the next older snapshot, the snapshot at time t1, is traversed and a search of the snapshot at time t1 is performed. The mapping associated with offset 1 is found in the snapshot at time t1, the search ends, and the snapshot at time t1 is used to service the request.

Figure 4:
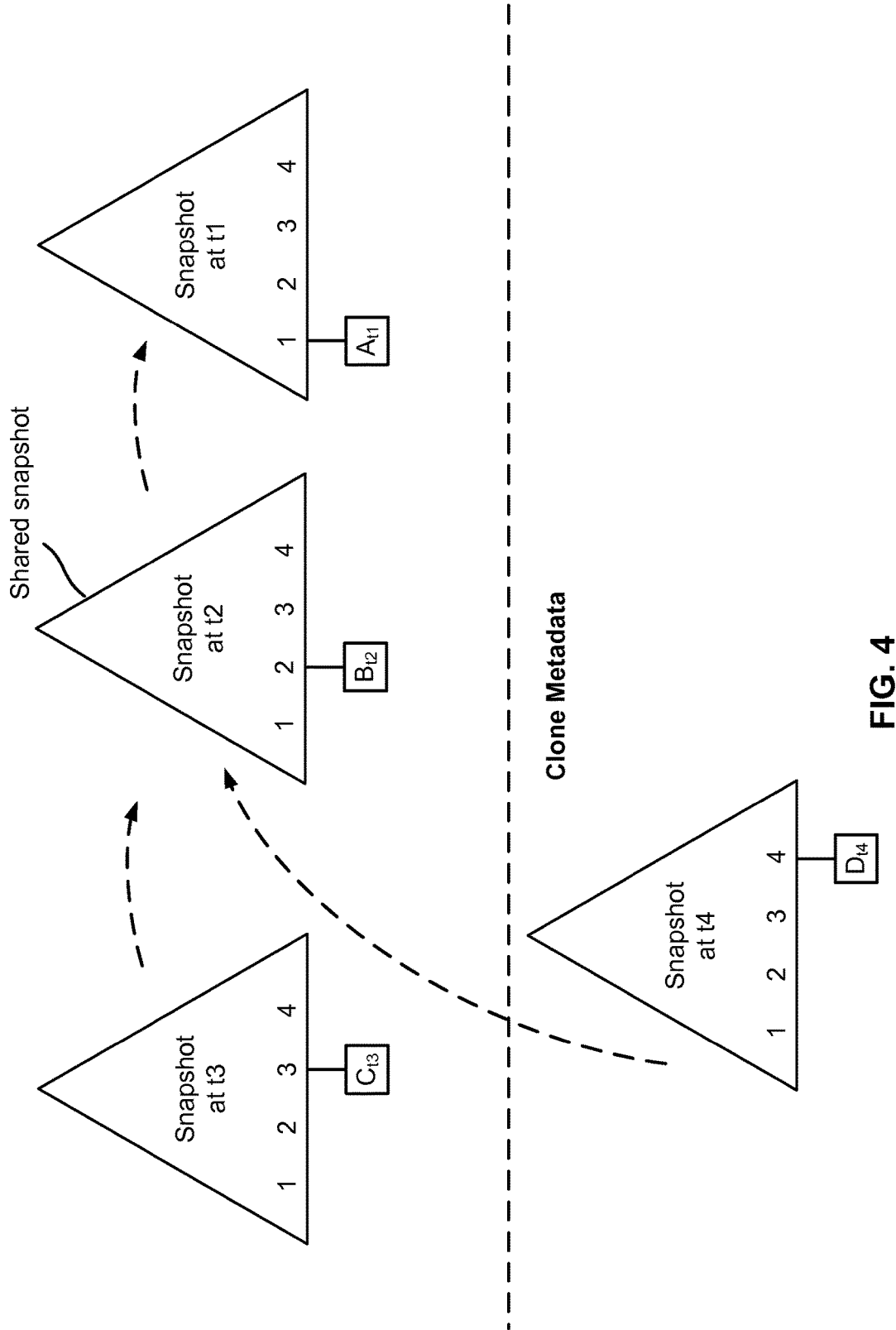
FIG. 4 is a diagram showing an example of a set of metadata associated with source data and a set of metadata associated with a clone.

FIG. 4 is a diagram showing an example of a set of metadata associated with source data and a set of metadata associated with a clone. In some embodiments, a clone may be created from an existing snapshot of a set of data. In the example, a snapshot of the source data was first created, then a clone was created from this snapshot. As previously described, in order to reduce metadata and data space consumption, snapshots are represented in a compact format that only stores the changes that have been made to the associated set of data since the previous snapshot was created. The set of metadata associated with the source data (the source metadata) includes a snapshot at time t3, a snapshot at time t2, and a snapshot at time t1. As shown in the example of FIG. 4, each of the snapshot at time t3, the snapshot at time t2, and the snapshot at time t1 is represented by a corresponding index. In the example, the clone is created from the snapshot at time t2 of the source metadata. Therefore, the snapshot at time t2 is now also referred to as a shared snapshot because it is now shared between the source data and its clone. While not shown in the example, one or more other clones besides the one shown may be created from the snapshot at time t2 of the source metadata. In some embodiments, each snapshot has an associated reference count that tracks the total number of clones that have been created from the snapshot. After a clone creation operation has completed, the reference count of the shared snapshot is incremented by the number of new clones that were created from the snapshot. When a clone is deleted, the reference count associated with the shared snapshot from which the clone was created is decremented by one. In some embodiments, the reference count of a shared snapshot is considered when it is determined whether the shared snapshot should be deleted. For example, a snapshot cannot be deleted if it has a non-zero reference count, thus preserving the data shared by the clones.

In various embodiments, creating clones (e.g., of snapshots of VMs) does not require copying metadata and/or data. Instead, a new set of metadata is created for a new clone. In some embodiments, the new set of metadata created for a new clone may include at least one or more of the following: a new file global ID, a current snapshot index (not shown in the diagram), an identifier associated with the shared snapshot from which the clone was generated, and an identifier associated with the set of source metadata (e.g., source sequence of snapshots). Furthermore, information associating each clone with the shared snapshot of the source data is stored. For example, information associating each clone with the shared snapshot of the source data may include the identifier ("snapshot global ID," which will be described in further detail below) that identifies the particular snapshot that is the shared snapshot from the sequence of snapshots associated with the source data. The snapshot itself may be composed of snapshots of data in multiple files. The snapshot metadata in turn identifies the files using the identifier file global ID and the relevant snapshot of the file using the local snapshot ID. The information associating the clone with the shared snapshot may be stored with the clone metadata, the source metadata, and/or elsewhere. For example, the associating data is a pointer or another type of reference that the clone can use to point to the index of the shared snapshot from which the clone was created. This link to the shared snapshot may be traversed during reads of the clone.

Snapshots may also be generated for a clone in the same manner that snapshots are generated for a non-clone. In the example of FIG. 4, after the clone was created, a snapshot at time t4, which is represented by a corresponding index, was generated (e.g., using a current snapshot index associated with the clone). Because the clone shares each snapshot of the source data including the shared snapshot (the snapshot at time t2 in the example of FIG. 4) and any older snapshots (the snapshot at time t1 in the example of FIG. 4), the clone's snapshot at time t4 includes data (D at logical offset 4) that has been modified since the shared snapshot has been created. The clone now includes data value B and data value A (via the pointer back to the shared snapshot of the source data), which it cloned from the source, and also data value D, which was written to the clone after it was created and captured in a snapshot of the clone. Note that the source data is not aware that data D has been written to the clone and/or captured in a snapshot of the clone.

To perform a read of a snapshot of the clone, the index of the snapshot is accessed first. If the desired data is not in the clone's snapshot index, then the clone's snapshots are traversed backwards in time. If one of the clone's snapshot indices includes a mapping for the logical block offset of the requested data, then data is read from the corresponding physical address and returned. However, if the desired data is not in any of the clone's snapshot indices, then the source's snapshots are traversed backwards in time starting from the shared snapshot on which the clone was based (i.e., if the mapping to the requested data is not found in the shared snapshot of the source metadata, then the link to the next older snapshot is traversed and searched, and so forth). In a first example, assume that a read operation to the clone requests for the current data associated with offset 4. First, the only snapshot of the clone, the snapshot at time t4, is searched for a mapping to data associated with offset 4. The mapping associated with offset 4 is found in the clone's snapshot at time t4, the search ends, and the data from the clone's snapshot index is used to service the request. In a second example, assume that a read operation to the clone requests data associated with offset 1. First, the only snapshot of the clone, the snapshot at time t4, is searched for a mapping to data associated with offset 1. The mapping is not found in the only snapshot of the clone, the snapshot at time t4, so the link (e.g., the stored associating data) from the clone's snapshot at time t4 to the shared snapshot is traversed and a search of the shared snapshot, the snapshot at time t2, is performed. The mapping is not found in the shared snapshot, so the link from the shared snapshot to the next older snapshot, the snapshot at time t1, is traversed and a search of the snapshot at time t1 is performed. The mapping associated with offset 1 is found in the snapshot at time t1 of the source data, the search ends, and the snapshot at time t1 is used to service the request. Therefore, the mapping found in the snapshot at time t1 of the source data is used to service the read operation to the clone. As shown in the second example, metadata (e.g., snapshots) may be shared between a non-clone and its clone and therefore, in some instances, read operations to the clone may be serviced by metadata associated with the source data.

Figure 5:
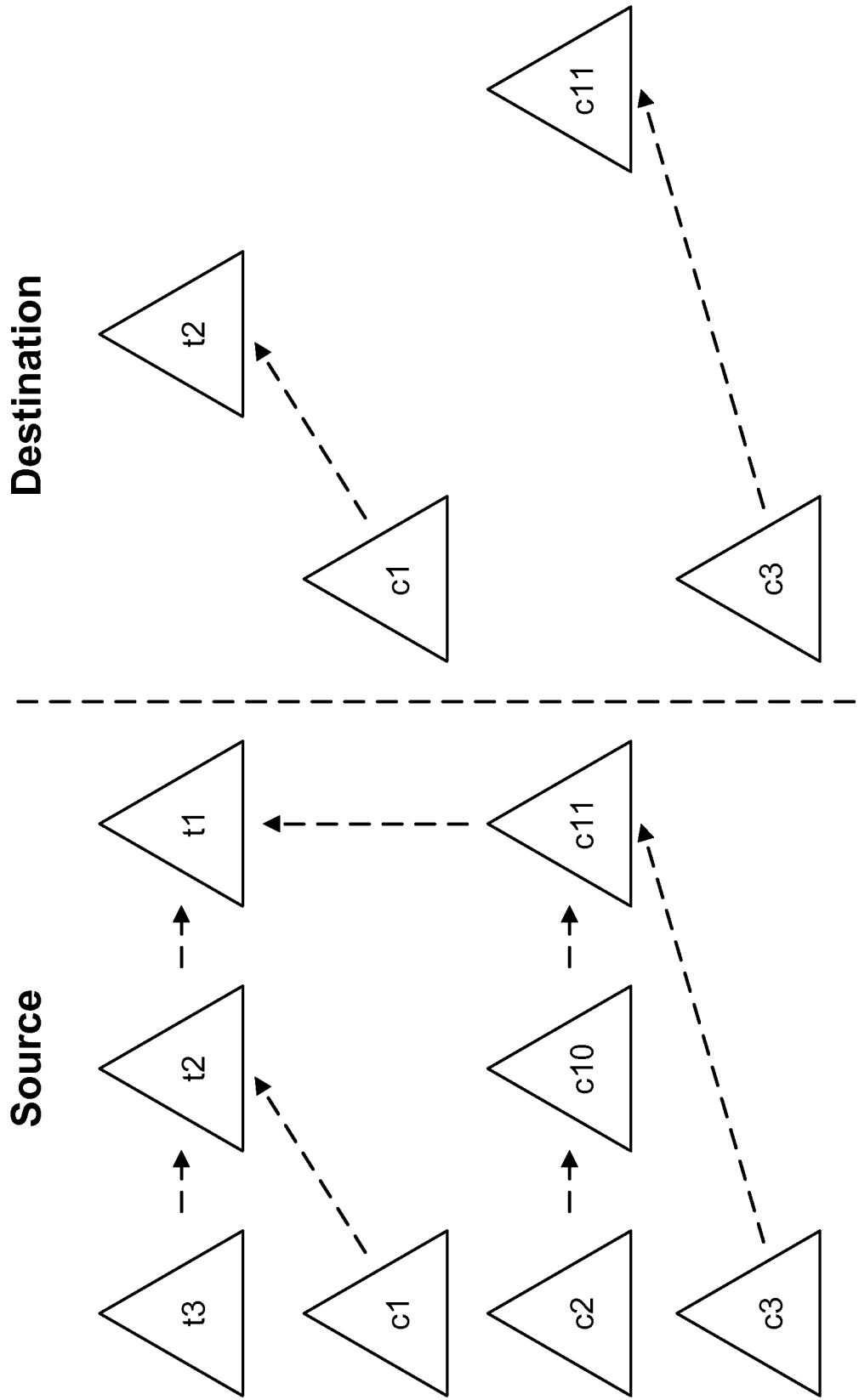
FIG. 5 is a diagram showing an example of snapshots that can be stored at a source system and a destination system.

FIG. 5 is a diagram showing an example of snapshots that can be stored at a source system and a destination system. As shown in the example, snapshots (e.g., the indices thereof) of various different dependencies (e.g., links to, points to, or otherwise references) on other snapshots (e.g., the indices thereof) can be stored at the source system and the destination system. Consider the following sequence of snapshots that is also shown at the source system:

$$t3 \rightarrow t2 \rightarrow t1$$

Here, the snapshot at time t3 is linked to its next older snapshot at time t2, which is in turn linked to its next older snapshot at time t1.

The snapshot at time t1 contains all changes made to the storage system since the beginning of time up to and including time t1.

The snapshot at time t2 contains changes made up to and including time t2 but after time t1.

The snapshot at time t3 contains any changes made up to and including time t3 but after time t2.

Given this set of changes, the state of the data at time t1, t2, or t3 can be recreated with their corresponding snapshots.

When replicating snapshots, many conventional approaches "expand" the state of the data at each point-in-time. In some embodiments, an expanded state of the data at a point-in-time contains all data values that exist or can be accessed at that point-in-time and is usually much larger than the delta representation at the same point-in-time, which only contains changes that have been made since the next older snapshot was generated. Therefore, these conventional approaches transmit the complete expanded state of the data at time t1, then the expanded state of the data at time t2 and so on, instead of just the deltas. Transmission of expanded states of data results in much more state information being transmitted and stored than if only the deltas were sent. Other conventional systems send only the deltas between states, but require that the deltas be sent in chronological order, in this example, first t1, then t2 and then t3. Yet other conventional systems may impose other significant constraints in either the order or subset in which snapshots and clones may be replicated.

In particular, due to ordering constraints of conventional systems, it may not be possible to skip t1, or to send t1 after t2, or if t1 is sent after t2, then only after expansion rather than as a delta, or if t2 is sent before t1, then only after expansion rather than as a delta. Similarly, it may not be possible in some conventional systems to delete t2 on the destination and then send t3 from the source as a delta. Some conventional systems may be unable to replicate younger snapshots until t2 is sent again.

On some conventional systems, it may not be possible to continue replication at all unless there is a common snapshot that can be used to generate deltas for replicating between the source and destination. In the above example, assume that if the source has only t3 and t2 and the destination has only t1 (t2 is deleted from the destination), then it may not be possible to replicate t3 in its minimal form. Re-establishing a common snapshot usually requires resending a snapshot previously deleted on destination, sometimes in fully expanded form. In this case, t2 may need to be resent to the destination.

On yet other conventional systems, it may not be possible to continue replication without losing data points. Consider a system where the source system has the snapshot at time t3 and destination has the snapshot at time t1. Since there is neither a common snapshot nor an incremental delta that the source system can send, it may not be possible to continue replication without deleting either t3 or t1.

As described above, a clone can be represented as an index that depends on (e.g., links to, points to, or otherwise references) a "shared snapshot" index. In the example shown in FIG. 5, a clone, c1, is created from the snapshot at time t2.

A snapshot may be shared by any number of clones and clones may themselves have snapshots, which may be shared by other clones. In the example shown in FIG. 5, a clone, c11, is created from the snapshot at time t1 and other clones, c10 and c3, may be created from c11.

Similar to snapshots, most conventional approaches replicate clones as expanded states or place restrictions on the subset or order in which the clones may be replicated. In particular, once clones are replicated they are no longer represented as deltas from shared snapshots, and therefore use much more space for data and metadata at the replication destination.

Considering the full set of use cases and operations involving snapshots, cloning, and replication is complex. One can, for example, replicate a set of snapshots and clones, clone from the replicated copies, create snapshots and clones from the new clones and then replicate these new snapshots and clones back to the original storage system. In particular, sometimes there may be constraints on replicating snapshots that originated or were subsequently derived from such snapshots back to the originating system. At other times, replicating the original or derived snapshots back to the originating system may result in loss of minimal representation.

Additional complexities arise if the conventional system supports the following two features:

The replication of snapshots and clones in arbitrary subsets or order, rather than in the strict order in which they were created.

The deletion of snapshots and clones in arbitrary order, irrespective of their replication status.

Preserving the minimal representation for replication and storage of snapshots and clones under such conditions is extremely difficult.

Embodiments described herein enable replicating snapshots and clones to be performed using a minimal amount of information, represented as changes or deltas, and to be transmitted and stored between the replicating storage systems. In the following, without loss of generality, the term "snapshot" refers collectively to non-clone snapshots and clone snapshots. However, the term "clone" specifically refers to clone snapshots rather than non-clone snapshots.

Figure 6:
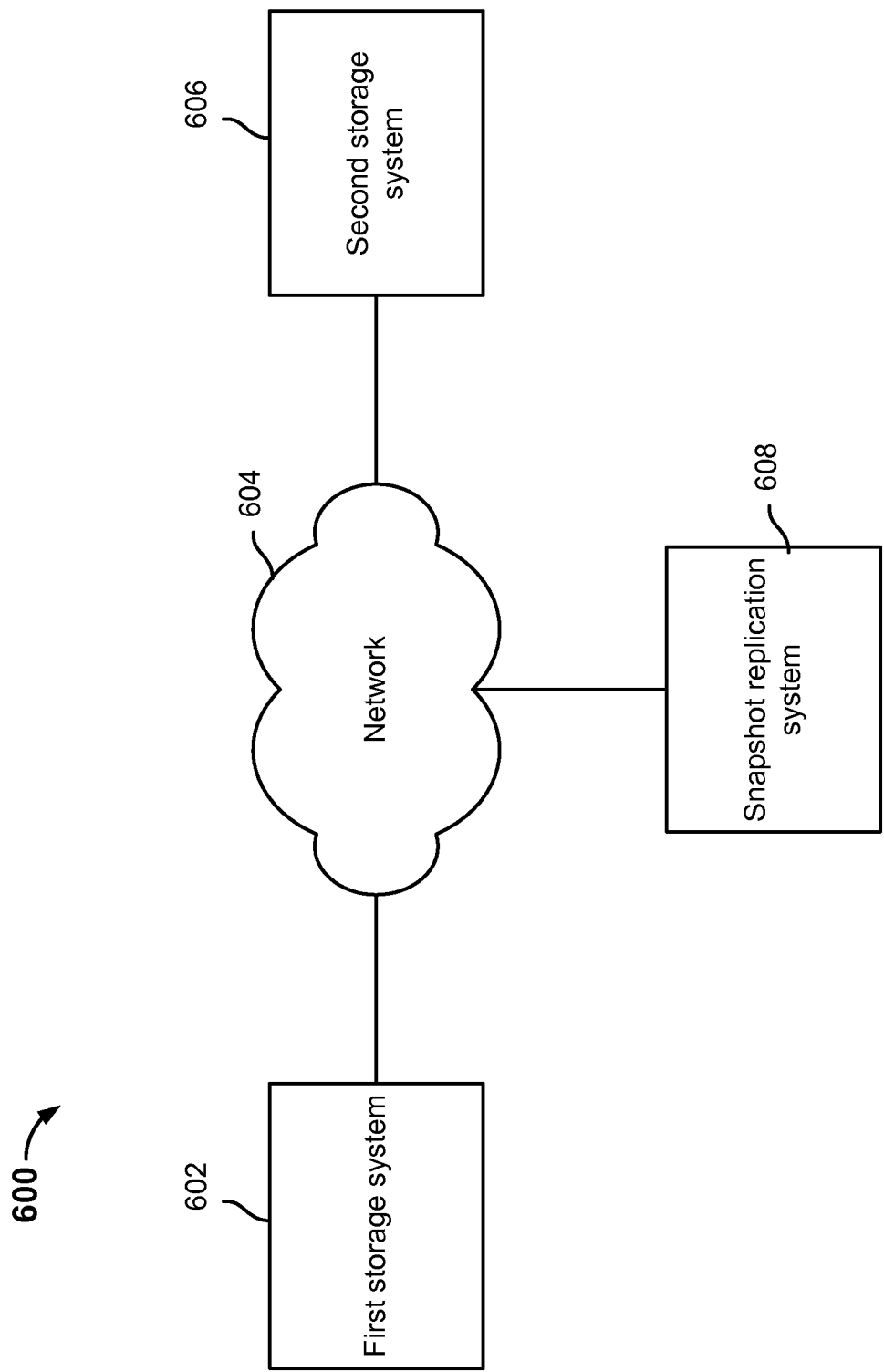
FIG. 6 is a diagram showing an embodiment of a system for performing replication of snapshots between storage systems.

FIG. 6 is a diagram showing an embodiment of a system for performing replication of snapshots between storage systems. As shown in the example, system 600 includes first storage system 602, network 604, second storage system 606, and snapshot replication system 608. Network 604 comprises high-speed data networks and/or telecommunications networks. In some embodiments, each of first storage system 602 and second storage system 606 is implemented with storage system 102 of system 100 of FIG. 1. First storage system 602 and second storage system 606 may communicate to each other and to snapshot replication system 608 over network 604.

First storage system 602 and second storage system 606 may each store a corresponding sequence of snapshots associated with the same set of data. For example, the set of data may be associated with a VM, a vdisk, or a file. In one example scenario in which both first storage system 602 and second storage system 606 would both maintain snapshots associated with the same set of data, first storage system 602 is associated with a production system and is configured to generate a snapshot for the set of data every configured interval. First storage system 602 would store a copy of each newly created snapshot and send a copy of the snapshot to second storage system 606, a backup system.

However, while both first storage system 602 and second storage system 606 may each store a corresponding sequence of snapshot indices associated with the same set of data, each of first storage system 602 and second storage system 606 may not necessarily store snapshot indices that represent the same points-in-time data states for the same set of data. For example, in the same scenario that is described above, first storage system 602, the production system, may have a shorter retention policy for at least some of its stored snapshots (e.g., because storage space is more scarce at the production system) than second storage system 606. As such, first storage system 602, the production system, may merge the index of a to-be-deleted snapshot into the index of an adjacent snapshot in its stored sequence of snapshots and then delete the index of the to-be-deleted snapshot. After deleting a snapshot index from the sequence of snapshot indices, the stored physical dependencies associated with the snapshot indices previously adjacent to the deleted snapshot index can be changed at first storage system 602 to accommodate the removal of that snapshot index. While first storage system 602, the production system, may have deleted a snapshot index from its sequence (e.g., to enforce a retention policy associated with that snapshot), second storage system 606, the backup system, may still maintain a copy of the snapshot. Sometime after first storage system 602, the production system, has deleted the snapshot from its sequence of snapshots, it may be desired to replicate the deleted snapshot back at first storage system 602. For example, a snapshot may be desired to be replicated at a storage system in the event of a disaster recovery or a desired reversion to an earlier point-in-time data state associated with the snapshot. As such, a set of snapshot data (e.g., an index) that can be used to represent the point-in-time data state associated with the desired snapshot at first storage system 602 can be sent from second storage system 606, the backup system, to first storage system 602, the production system. In some embodiments, the set of snapshot data comprises a delta between two snapshot indices stored at the source system (second storage system 606 in this example). The set of snapshot data sent by second storage system 606 can be used to generate a snapshot index to represent the point-in-time data state associated with the desired snapshot and then the snapshot index can be inserted into the sequence of snapshot indices stored at first storage system 602, as will be described in further detail below. Likewise, a desired snapshot can be replicated from first storage system 602 and inserted into the sequence of snapshots stored at second storage system 606.

When replicating a snapshot from one system to another, the ordering, that is the younger/older relationship between snapshots maintained by different systems, may be deduced using identifying information associated with each snapshot. Examples of identifying information associated with each snapshot include the following:

A "snapshot global ID" associated with each snapshot comprises a combination (e.g., a concatenation) of the following two identifiers: 1) a "creator file system ID" and 2) a "creator snapshot ID." The "creator file system ID" comprises a (e.g., 64-bit) global unique identifier of the storage system that created the snapshot. In some embodiments, while several different storage systems can store snapshots associated with a set of data, only the storage system that created a clone from the set of data can generate new snapshots for the clone. However, other storage systems may create new clones based on the snapshots of the aforementioned clone and create new snapshots for the new clones. In FIG. 6, in some embodiments, while both first storage system 602 and second storage system 606 may each store a corresponding sequence of snapshots associated with the same set of data, assume that in this example, only first storage system 602 may generate new snapshots for that set of data. The "creator snapshot ID" comprises an (e.g., 64-bit) identifier that is determined by storing a counter that is incremented each time a new snapshot is created on the storage system. As such, a younger snapshot will also have a higher creator snapshot ID than an older snapshot created by the same storage system. The "snapshot global ID" of a snapshot uniquely identifies the "expanded" state of the set of data at the point-in-time associated with the snapshot. That is, two "copies" of a snapshot on two different storage systems with the same snapshot global ID correspond to the same expanded state. However, snapshots associated with the same snapshot global ID may be represented using different physical representations (e.g., indices) at different storage systems depending on the other snapshots of the same sequence that are stored at those storages systems. For example, assume that if the storage system with the creator file system ID of "PRODUCTION1" creates a sequence of snapshots with respective creator snapshot IDs of "S1, S2," and "S3," then the snapshot global ID of the sequence of snapshots would be "PRODUCTION1-S1," "PRODUCTION1-S2," and "PRODUCTION1-S3." The use of snapshot global IDs allows any storage system or a snapshot replication system 608 to determine the ordering relationship of the three snapshots even if one or more of the snapshots are deleted. The management of snapshot global IDs allows each storage system to build a graph of "next younger" relationships that can be used to replicate and store snapshots efficiently as deltas rather than expanded states.

A "snapshot file global ID" associated with each snapshot comprises a combination (e.g., a concatenation) of the following three identifiers: 1) a "creator file system ID" 2) a "creator snapshot ID" and 3) a "file global ID." The "creator file system ID" and the "creator snapshot ID" for the "snapshot file global ID" are the same as for the "snapshot global ID," as described above. The "file global ID" comprise an identifier of the set of data with which the snapshot is associated. For example, the file global ID can identify the particular file or vdisk or a cloned file of any of the aforementioned sets of data with which the snapshot is associated. The file global ID can be used to determine which snapshots belong to which sequence of snapshots and/or set of metadata. For example, the file global ID of two snapshots associated with the same creator file system ID but different creator snapshot IDs can help determine that the two snapshots belong to two different sequences of snapshots, one of which to a particular VM and the other to a clone of that VM.

The identifying information described above associated with each snapshot that is stored at each of first storage system 602 and second storage system 606 may be stored by one or more of first storage system 602, second storage system 606, and snapshot replication system 608. The identifying information can be used by at least one of first storage system 602, second storage system 606, and snapshot replication system 608 to determine which snapshots are stored at which systems and also deduce the ordering of snapshots. Therefore, such identifying information can be used to perform replication of snapshots from first storage system 602 to second storage system 606, and vice versa, regardless of which storage system had created the snapshots and/or the order in which snapshots are replicated. Such identifying information can also be used to preserve the younger/older relationship between snapshots in a sequence at a system when replicating a snapshot into the sequence stored at that system. Snapshot replication system 608 may not necessarily store snapshots but it may be configured to determine the set of snapshot data that should be sent from a source system to a destination system in order to replicate a desired snapshot at the destination system.

To guarantee that snapshots are always replicated in the most efficient manner, the identifying information may be pruned only when a snapshot has been deleted from all systems. In some embodiments, however, some information may be pruned when it is deemed that the benefits of keeping the information are low.

In various examples below, for purposes of illustration, it is assumed that all the snapshots are associated with the same creator file system ID and file global ID (unless otherwise noted), and therefore the expanded state (i.e., the point-in-time data state) that is accessible from a snapshot is uniquely denoted by the creator snapshot ID, which may be written in the format of "snapshot at time t<creator snapshot ID>" or "snapshot at t<creator snapshot ID>."

Figure 7:
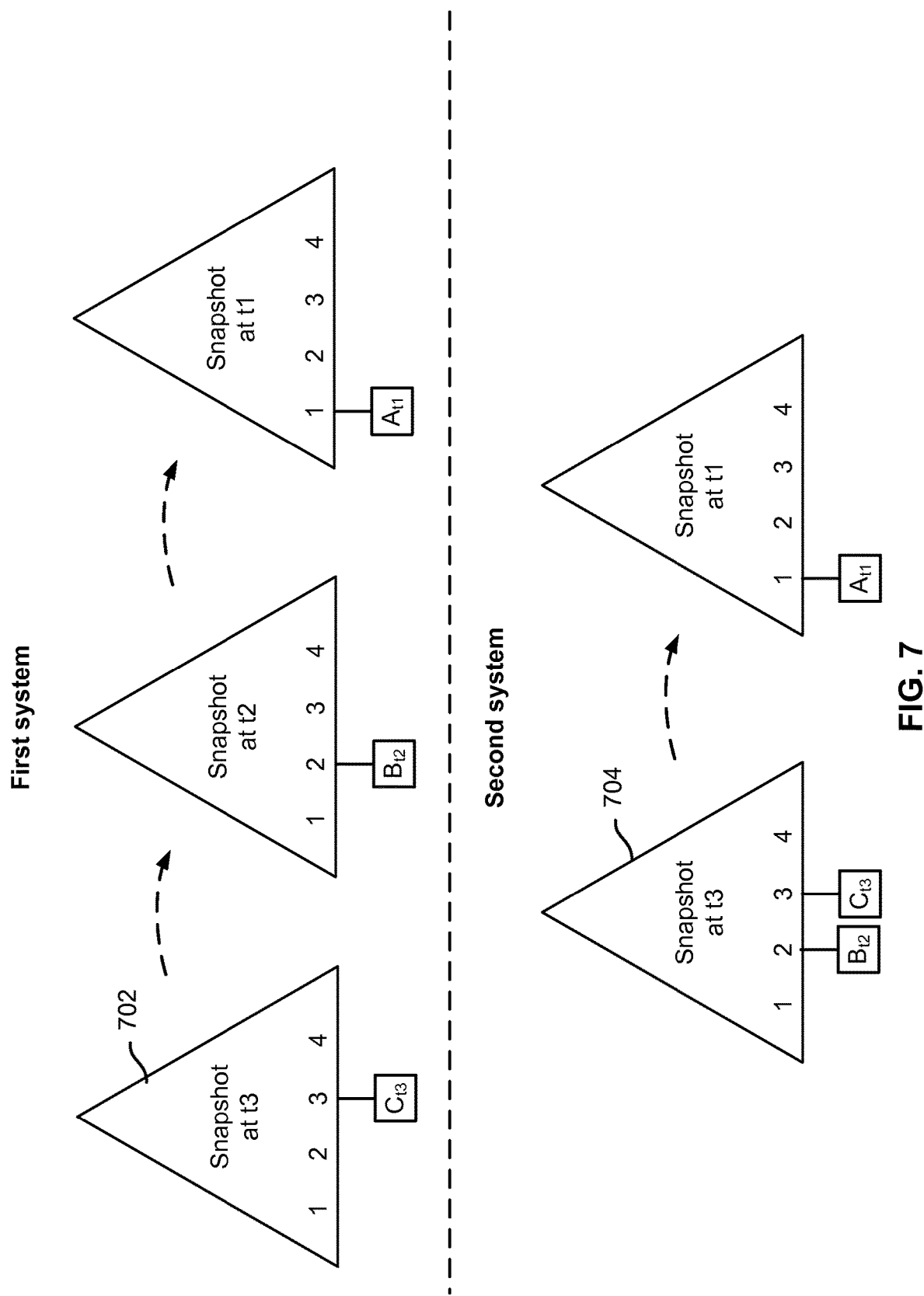
FIG. 7 is a diagram showing an example of how snapshot indices associated with the same expanded data state may differ at different storage systems.

FIG. 7 is a diagram showing an example of how snapshot indices associated with the same expanded data state may differ at different storage systems. In the example, the first system stores a sequence of three snapshots associated with a particular set of data (e.g., a VM, a vdisk, or a file) and the second system stores a sequence of two snapshots associated with the same set of data. Each snapshot is represented as an index that maps logical offsets (e.g., 1, 2, 3, or 4) to data values stored at corresponding physical offsets.

The expanded states (i.e., point-in-time states) of the set of data that can be accessed from the first system include the snapshot at time t1, the snapshot at time t2, and the snapshot at time t3. As shown in the example of FIG. 7, each of the respective indices associated with the snapshot at time t1, the snapshot at time t2, and the snapshot at time t3 at the first system links back to (e.g., physically depends on) the next older snapshot (e.g., the snapshot at time t3 links to snapshot at time t2 and snapshot at time t2 links to snapshot at time t1).

The expanded states (i.e., point-in-time states) of the set of data that can be accessed from the second system include the snapshot at time t1 and the snapshot at time t3. For example, the second system may have previously stored a copy of the snapshot at time t2 but then determined to delete the snapshot at time t2. Prior to deleting its copy of the snapshot at time t2, the second system merged the data from the index associated with the snapshot at time t2 into index 704 associated with its snapshot at time t3. As such, index 704 associated with the snapshot at time t3 stored at the second system includes the data (e.g., a mapping of offset 2 to data value B) from the snapshot at time t2 and is also modified to link to the index associated with the snapshot at time t1 at the second system.

Note that while both the first and second system store the expanded state of the set of data accessible from the snapshot at time t3, the respective snapshot indices used to represent the snapshot at time t3 at each of the two systems are different due to the presence of different snapshots at each system. The snapshot at time t3 stored at the first system is represented by index 702 and the snapshot at time t3 stored at the second system is represented by index 704. Snapshot at time t3 index 702 at the first system, which includes only a mapping of offset 3 to data value C, differs from snapshot at time t3 index 704 at the second system, which includes a mapping of offset 2 to data value B and a mapping of offset 3 to data value C, because the snapshot at time t3 index 702 links to an index associated with the snapshot at time t2 while snapshot at time t3 index 704 links to an index associated with the snapshot at time t1. As such, due to the presence of different snapshots (e.g., and therefore, different dependencies between the snapshots) associated with the same set of data at different systems, snapshots associated with the same expanded state may be represented using different indices at different systems.

As will be described in various examples below, after a snapshot is replicated at a destination system and inserted into an existing sequence of snapshots at the destination system, the source system and the destination system will both store a copy of that snapshot, but each system may store a different physical representation (e.g., index) to represent that snapshot, depending on the other snapshots that the system stores.

Figure 8:
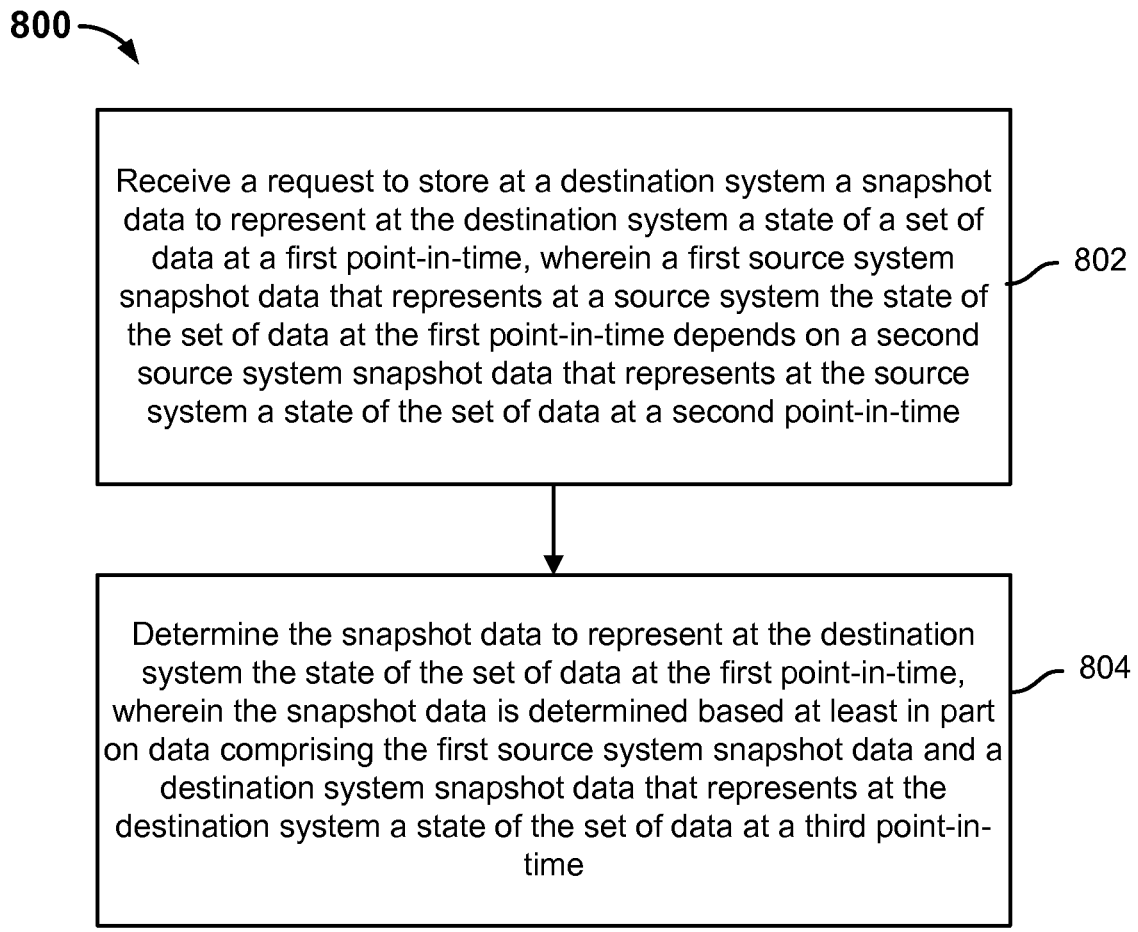
FIG. 8 is a flow diagram showing an embodiment of a process for performing replication of a selected snapshot from a source system to a destination system.

FIG. 8 is a flow diagram showing an embodiment of a process for performing replication of a selected snapshot from a source system to a destination system. In some embodiments, the source system and the destination system of process 800 can be implemented using first storage system 602 and second storage system 606 of system 600 of FIG. 6, respectively, or second storage system 606 and first storage system 602, respectively. In some embodiments, process 800 is implemented at first storage system 602, second storage system 606, or snapshot replication system 608 of system 600 of FIG. 6.

At 802, a request to store at a destination system a snapshot data to represent at the destination system a state of a set of data at a first point-in-time is received, wherein a first source system snapshot data that represents at a source system the state of the set of data at the first point-in-time depends on a second source system snapshot data that represents at the source system a state of the set of data at a second point-in-time.

For example, a snapshot stored at a source system that is identified by its corresponding point-in-time (i.e., expanded state) (e.g., associated with identifying information such as the snapshot global ID or the snapshot file global ID) is selected (e.g., by a system administer and/or computer program) to be replicated at a destination system. The snapshot data (e.g., index or other type of physical representation) of the selected snapshot at the source system depends on the snapshot data (e.g., index or other type of physical representation) of a next older snapshot in a sequence of snapshot data (e.g., indices) stored at the source system. The snapshot index of the selected snapshot being dependent on the snapshot index of the next older snapshot describes that the data stored in the snapshot index of the selected snapshot comprises new/modified data relative to the time at which the snapshot index of the next older snapshot was generated. In some embodiments, the selected snapshot does not need to be replicated in a particular chronological order. Put another way, the selected snapshot does not need to be replicated only after the next older snapshot was replicated.

At 804, the snapshot data to represent at the destination system the state of the set of data at the first point-in-time is determined, wherein the snapshot data is determined based at least in part on data comprising the first source system snapshot data and a destination system snapshot data that represents at the destination system a state of the set of data at a third point-in-time.

The point-in-time (i.e., expanded state) of an existing snapshot at the destination system can be identified (e.g., using the stored identifying information) to help determine the older/younger and/or difference in point-in-time relationships between the selected snapshot at the source system and the existing snapshot at the destination system. Such ordering relationships can be used to determine how data can be (e.g., efficiently) sent from the source system to replicate the selected snapshot at the destination system. The snapshot data (e.g. index) determined to be sent from the source system to the destination system can include metadata (e.g., logical mappings to underlying data) and underlying data. In various embodiments, the snapshot data determined to be sent from the source system to the destination system comprises a delta determined based at least in part on the snapshot index of the selected snapshot and the snapshot index of another snapshot stored at the source system. For example, the other snapshot may be one on which the selected snapshot depends (e.g., links to). Sending deltas between snapshot data (e.g., indices) is much more efficient than sending expanded states of snapshots, as is conventionally done. In some cases, a smaller delta may be created by comparing with a younger, rather than older snapshot. In some embodiments, inserting the snapshot data into the existing snapshot sequence at the destination system includes removing entries from the snapshot index of an existing snapshot relative to the snapshot data (refactoring, as will be described in further detail below), adding a new snapshot data (e.g., index) to the snapshot data sequence at the destination system to represent at the destination system the point-in-time data state associated with the selected snapshot, and/or changing the dependencies of the snapshot indices at the snapshot data sequence at the destination system to accommodate the addition of the new snapshot index.

FIGS. 9A and 9B are diagrams showing an example of replicating the snapshot at time t2 from a source system to a destination system. As shown in FIG. 9A, the snapshot sequence at the source system includes the snapshot at time t2 linking to the snapshot at time t1. Note that the snapshot at time t2 is represented by index 904 at the source system. Also, as shown in FIG. 9A, the snapshot sequence at the destination system, prior to the snapshot at time t2 being replicated, includes the snapshot at time t3 linking to the snapshot at time t1. Note that prior to the snapshot at time t2 being replicated, the snapshot at time t3 is represented by index 902 at the destination system. Before replication of the snapshot at time t2, snapshot at time t3 index 902 contained all the changes up to and including time t3 and after t1, which includes a mapping of offset 1 to data value A (stored at time t3) and a mapping of offset 3 to data value C (stored at time t2). In performing the replication of the snapshot at time t3, an index associated with the snapshot at time t2 would need to be "spliced" in between the snapshot at time t3 and the snapshot at time t1 at the destination system. In various embodiments, "splicing" is the process by which a snapshot is inserted in a sequence of snapshots. A snapshot can be spliced as an intermediate snapshot in between two existing snapshots of a sequence, as the youngest snapshot in the sequence, or as the oldest snapshot in the sequence. Splicing includes changing the physical dependencies between snapshots such that a younger existing snapshot that becomes adjacent to the spliced snapshot in the sequence is caused to depend on (e.g., link to, point to, and/or otherwise reference) the spliced snapshot. Splicing also includes causing the spliced snapshot to depend on an older existing snapshot that becomes adjacent to the spliced snapshot in the sequence.

It can be determined from the identifying information stored by either or both the source system and the destination system and/or a third system (e.g., a snapshot replication system), snapshots associated with which point-in-times (e.g., expanded states) are already stored at the destination system and which order in the sequence they would be relative to the selected snapshot. Given that the destination system already stored the snapshot at time t1, to minimize the amount of data to transmit from the source system to the destination system, the source can send the delta between the snapshot at time t2 at the source system and the snapshot at time t1 at the source system. This delta between the snapshot at time t2 and the snapshot at time t1 at the source system may be represented by index 904 of FIG. 9B. (Given that the index 904 associated with the snapshot at time t2 at the source system already contains only the changes since the snapshot at time t1 was generated, the delta between the snapshot at time t2 at the source system and the snapshot at time t1 at the source system is therefore the same as the index that is used to represent the snapshot at time t2 at the source system.)

The delta between the snapshot at time t2 and the snapshot at time t1 at the source system as represented by index 904 is sent from the source system to the destination system and spliced into the existing snapshot sequence, in between the snapshot at time t3 and the snapshot at time t1, to represent the snapshot at time t2 at the destination system. Because the snapshot at time t3 index 902 at the destination system had contained all the changes up to and including time t3 and after t1, after the insertion of index 904 at the destination system, the redundant entries between index 902 representing the snapshot at time t3 and index 904 representing the snapshot at time t2 need to be removed from index 902 at the destination system. As such, replication as described herein can take advantage of a snapshot that is already present on the destination system by "refactoring" the replicated snapshot data at the destination. In various embodiments, "refactoring" is the process by which redundant metadata entries are removed from either a younger snapshot or an older snapshot between the replicated snapshot and an adjacent existing snapshot of the destination system. Redundant entries are often created when a snapshot is replicated and spliced into an existing snapshot sequence at a different system. The replicated snapshot and an adjacent existing younger or older snapshot will sometimes contain some of the same entries as the replicated snapshot, making the shared entries in the index of the replicated or its adjacent existing snapshot redundant. As shown in FIG. 9B, after replication of the snapshot at time t2 at the destination, the entry associated with a mapping of offset 3 to data value C is removed from index 902 representing the snapshot at time t3 at the destination system because the same entry is already present in index 904 representing an existing older snapshot at the destination system, the snapshot at time t2.

After replication, at the destination system, the snapshot sequence includes the snapshot at time t3 (which has been modified to link to the snapshot at time t2), the snapshot at time t2 (which has been modified to link to the snapshot at time t1), and the snapshot at time t1. As such, replication of a snapshot to a destination system can modify the physical dependencies among snapshots of a sequence at the destination system.

FIGS. 10A and 10B are diagrams showing an example of replicating the snapshot at time t3 from a source system to a destination system. As shown in FIG. 10A, the snapshot sequence at the source system includes the snapshot at time t3 linking to the snapshot at time t1. Also, as shown in FIG. 10A, the snapshot sequence at the destination system, prior to the snapshot at time t3 being replicated, includes the snapshot at time t2 linking to the snapshot at time t1. Note that the snapshot at time t3 is represented by index 1002 at the source system. Before replication of the snapshot at time t3, the snapshot at time t3 index 1002 contained all the changes up to and including time t3 and after t1, which includes a mapping of offset 1 to data value A (stored at time t3) and a mapping of offset 3 to data value C (stored at time t2). In performing the replication of the snapshot at time t3, an index associated with the snapshot at time t3 would need to be "spliced" to link to the snapshot at time t2 at the destination system.

It can be determined from the identifying information stored by either or both the source system and the destination system and/or a third system (e.g., a snapshot replication system), snapshots associated with which point-in-times (e.g., expanded states) are already stored at the destination system and which order in the sequence they would be relative to the selected snapshot. Ideally, the source system would generate a delta between the snapshot at time t3 and the snapshot time t2, but the source does not have the snapshot time t2. In this case, the source can generate a delta relative to the snapshot at time t1, the most recent snapshot older than the snapshot at time t3 that is stored at both the source and destination systems. This delta between the snapshot at time t3 and the snapshot at time t1 may be represented by index 1002 of FIG. 10B. (Given that index 1002 associated with the snapshot at time t3 at the source system already contains only the changes since the snapshot at time t1 was generated, the delta between the snapshot at time t3 at the source system and the snapshot at time t1 at the source system is therefore the same as the index that is used to represent the snapshot at time t3 at the source system.)

Once the delta is received at the destination, it is spliced to point to the snapshot at time t2 at the destination system and then refactored to create index 1004 to represent the snapshot at time t3 at the destination system by eliminating entries from the delta comprising index 1002 that are common with an existing older snapshot at the destination system, the snapshot at time t2, which is represented by index 1006. As shown in FIG. 10B, after replication of the snapshot at time t3 at the destination, the entry associated with a mapping of offset 3 to data value C is removed from the delta comprising index 1002 to create index 1004 to represent the snapshot at time t3 because the same entry is already present in index 1006 representing the snapshot at time t2.

In some embodiments, the refactoring of the replicated snapshot at time t3 at the destination system (i.e., the delta comprising index 1002) relative to the snapshot at time t2 can also be done as the delta is received at the destination. Put another way, refactoring can be performed before the entire set of snapshot data (the delta) (including the logical to physical offset mappings and the underlying data to which they map) is completely sent from the source to the destination. For example, referring to FIG. 10B, for each offset of delta snapshot index 1002 that is common to index 1006, which represents the snapshot at time t2 at the destination system, prior to sending the underlying data to which the offset points from the source system, a determination can be made as to whether a fingerprint associated with the underlying data pointed to by the offset in the delta snapshot index 1002 matches the fingerprint associated with the underlying data pointed to by the same offset in the index 1006. In the event that the two fingerprints match, then the two offset entries are determined to be redundant, and therefore, the entry is excluded from index 1004 that is used to represent the snapshot at time t3 at the destination system and the underlying data pointed to by the redundant offset is also not sent from the source system. Put another way, the replication need not be completed before refactoring is performed.

In another embodiment, the destination system could send the source system a temporary copy of the snapshot at time t2 (e.g., as a delta between the snapshot at time t2 and the snapshot at time t1) that the source system can use to generate a delta between the snapshot at time t3 and the snapshot at time t2. Then, the delta between the snapshot at time t3 and the snapshot at time t2 can be sent from the source system to be spliced to point to the snapshot at time t2 at the destination system.

Figure 11A:
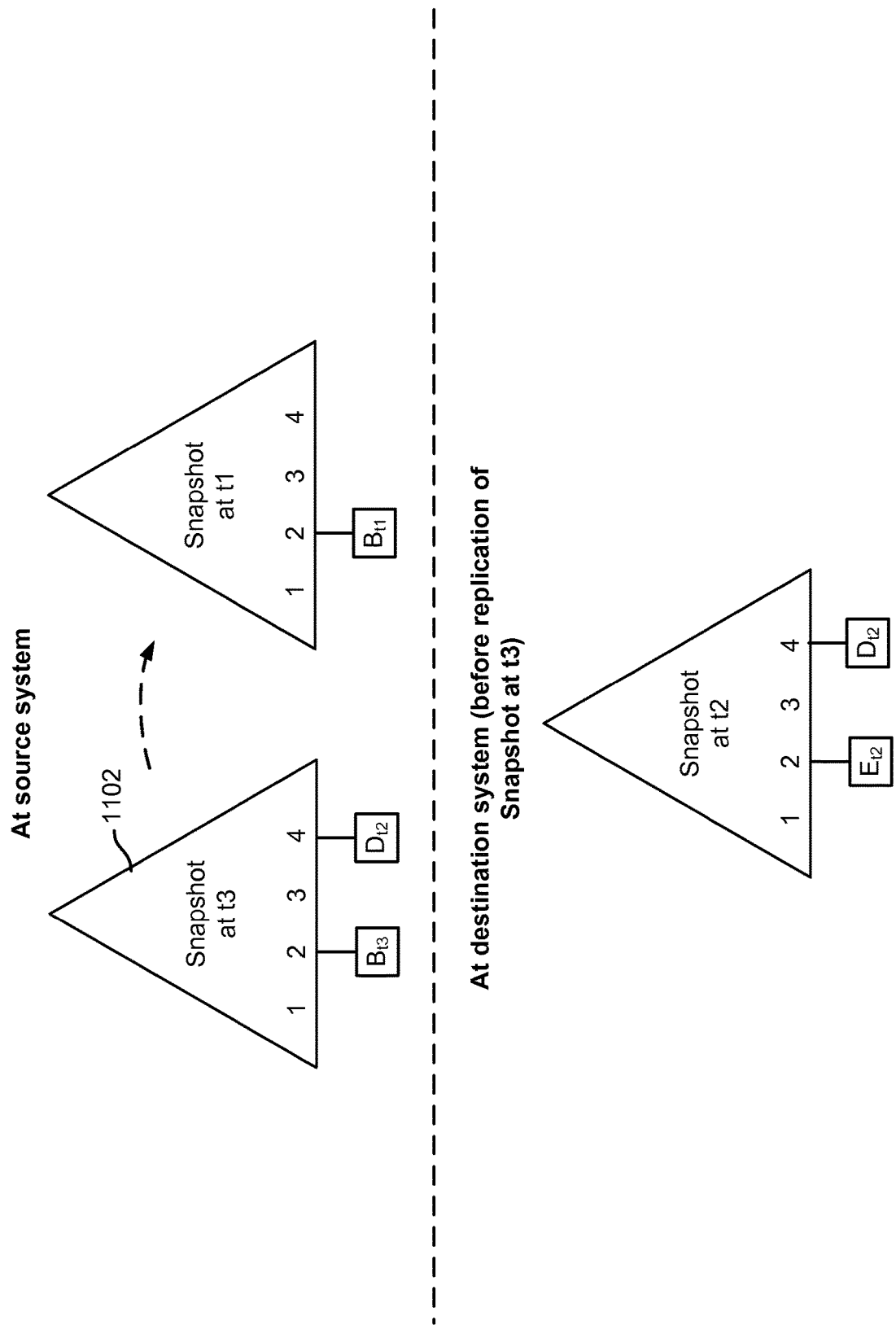

FIGS. 11A and 11B are diagrams showing another example of replicating the snapshot at time t3 from a source system to a destination system. In this example, the snapshots at times t1, t2, and t3 were created sequentially as a part of the same snapshot sequence. In some embodiments, a "common snapshot" refers to a point-in-time snapshot as the snapshot against which a delta is generated at the source system and against which the delta will be spliced at the destination system. As shown in FIG. 11A, prior to the snapshot at time t3 being replicated, the source has only the snapshot at time t3 and the snapshot at time t1 while the destination has only the snapshot at time t2. In other words, prior to the snapshot at time t3 being replicated, the source and the destination systems do not have a common snapshot of the snapshot at time t2. Note that the snapshot at time t3 is represented by index 1102 at the source system. Before replication of the snapshot at time t3, snapshot at time t3 index 1102 at the source system contained all the changes up to and including time t3 and after t1, which includes a mapping of offset 2 to data value B (stored at time t3) and a mapping of offset 4 to data value D (stored at time t2). In performing the replication of the snapshot at time t3, an index associated with the snapshot at time t3 would need to be "spliced" to link to the snapshot at time t2 at the destination system. In this example, snapshot at time t3 index 1102 at the source system has not been refactored with respect to the index of the snapshot at time t1 at the source system because both indices include a mapping of offset 2 to data value B. However, given that there is no common snapshot of the snapshot at time t2 on the source and destination systems, the same data values associated with the same offset at adjacent snapshot indices at the source system may be preserved and used in generating a delta at the source system, as will be described further below.

It can be determined from the identifying information stored by either or both the source system and the destination system and/or a third system (e.g., a snapshot replication system), snapshots associated with which point-in-times (e.g., expanded states) are already stored at the destination system and which order in the sequence they would be relative to the selected snapshot. In this case, the source generates a delta of the snapshot at time t3 relative to the snapshot at time t1. This delta between the snapshot at time t3 and the snapshot at time t1 may be represented by index 1102 of FIG. 10B. (Given that index 1102 associated with snapshot at time t3 at the source system already contains only the changes since the snapshot at time t1 was generated, the delta between the snapshot at time t3 at the source system and the snapshot at time t1 at the source system is therefore the same as the index that is used to represent the snapshot at time t3 at the source system.) Note that in this case where the source system and the destination system do not have a common snapshot of the snapshot at time t2, the delta must contain all "offsets" that were modified between the snapshots at times t3 and t1 even if the data values are the same. In particular, it is possible for the same offset to be modified at the snapshots at times t1, t2 and t3 such that the data values in the snapshots at times t1 and t3 are the same but different in the snapshot at time t2. In such a case, comparing the data values between the snapshots at times t3 and t1 would detect no change even though this data value must be applied to the snapshot at time t2 in order to create the snapshot at time t3. Note that by including all offsets that were modified between the snapshots at times t3 and t1, we ensure that any offsets that were modified between the snapshots at times t2 and t1 are also included.

As shown in FIG. 11A, at the source system, offset 2 has been modified in between when the snapshots at times t1 and t3 were generated even though the snapshots at times t1 and t3 store the same data value of B for offset 2. Given that the source system and the destination system do not have a common snapshot of the snapshot at time t2, index 1102 associated with the delta between the snapshot at time t3 at the source system and the snapshot at time t1 at the source system includes offset 2 even though the data values are the same at offset 2 in both snapshots at times t1 and t3.

By contrast, when there is a common snapshot, as described in previous examples, the delta may exclude data values that are the same between the two snapshots even if the corresponding offsets were modified in the younger snapshot.

Once the delta is received at the destination, it is spliced to point to the snapshot at time t2 at the destination system and then refactored to represent the snapshot at time t3 at the destination system by eliminating entries from the delta comprising index 1102 that are common with the snapshot at time t2, which is represented by index 1104 at the destination system. As shown in FIG. 11B, after replication of the snapshot at time t3 at the destination, the entry associated with a mapping of offset 4 to data value D is removed from index 1102 representing the snapshot at time t3 because the same entry is already present in index 1104 representing the snapshot at time t2 at the destination system. In some embodiments, the refactoring may be performed prior to the completion of the replication of the snapshot at time t3 at the destination system.

Figure 12A:
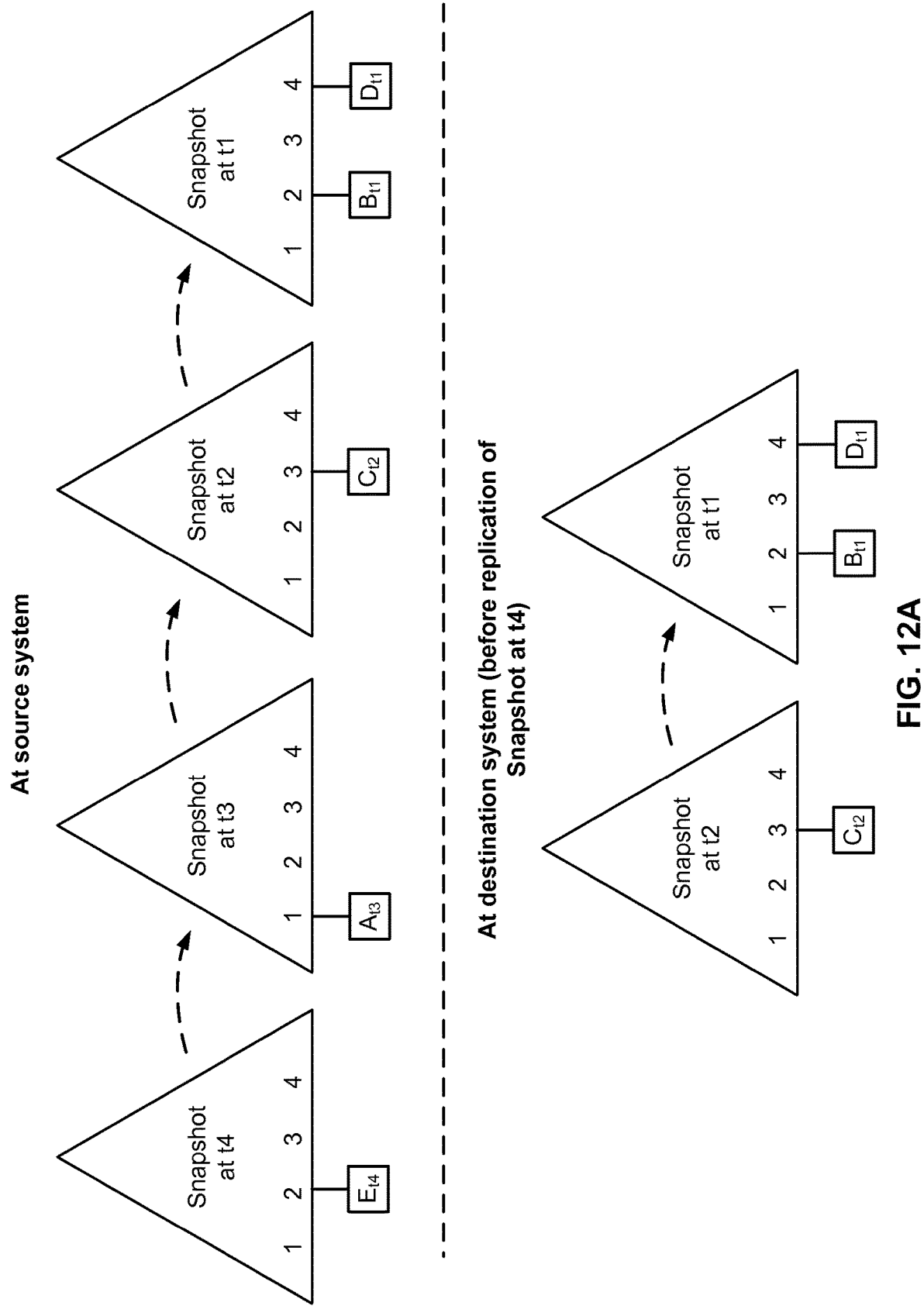

FIGS. 12A and 12B are diagrams showing another example of replicating the snapshot at time t4 from a source system to a destination system. In this example, the snapshots at times t1, t2, t3, and t4 were created sequentially as a part of the same snapshot sequence. However, as shown in FIG. 12A, prior to the snapshot at time t4 being replicated, the source has the snapshots at times t4, t3, t2, and t1 while the destination has only the snapshot at time t2 and the snapshot at time t1.

It can be determined from the identifying information stored by either or both the source system and the destination system and/or a third system (e.g., a snapshot replication system), snapshots associated with which point-in-times (e.g., expanded states) are already stored at the destination system and which order in the sequence they would be relative to the selected snapshot. Given that the destination system already stored the snapshot at time t2, to minimize the amount of data to transmit from the source system to the destination system, in one example, the source can send the delta between the snapshot at time t4 at the source system relative to the snapshot at time t2 at the source system. Prior to generating the delta of the snapshot at time t4 relative to the snapshot at time t2, the entries of the snapshot at time t3 are first merged into the snapshot at time t4. For example, in generating the delta of the snapshot at time t4 relative to the snapshot at time t2, the entries of the snapshot at time t3 are first logically merged into the snapshot at time t4 (while not actually deleting the index of the snapshot at time t3 from the source system) and then the delta is generated between the index of the snapshot at time t4 merged with the offsets of the snapshot at time t3 and the snapshot at time t2. This delta between the snapshot at time t4 (with the merged entries of the snapshot at time t3) and the snapshot at time t2 may be represented by index 1202 of FIG. 12B. Once the delta is received at the destination, it is spliced to point to the snapshot at time t2 at the destination system. In this example, because the delta is being generated and spliced with respect to the same snapshot on source and destination, the snapshot at time t2 in this example, then there is not an opportunity for refactoring at the destination system. As such, index 1202 representing the delta can be used directly at the snapshot at t4 at the destination system.

In another example (not shown in FIG. 12B), instead of the source sending the delta of the snapshot at time t4 at the destination system relative to the snapshot at time t2 at the destination system, the source generates the expanded state of data at the snapshot at time t4. An index representing the expanded state of data at the snapshot at time t4 would include mappings of offset 1 to data value A, offset 2 to data value E, offset 3 to data value C, and offset 4 to data value D. The index representing the expanded state of data at the snapshot at time t4 would be sent to the destination. At the destination, the index representing the expanded state of data at the snapshot at time t4 would be refactored to remove redundant entries from the snapshot at time t2 at the destination system and the snapshot at time t1 at the destination system. The resulting index to use to represent the snapshot at time t4 at the destination system would still be index 1202 of FIG. 12B.

Figure 13:
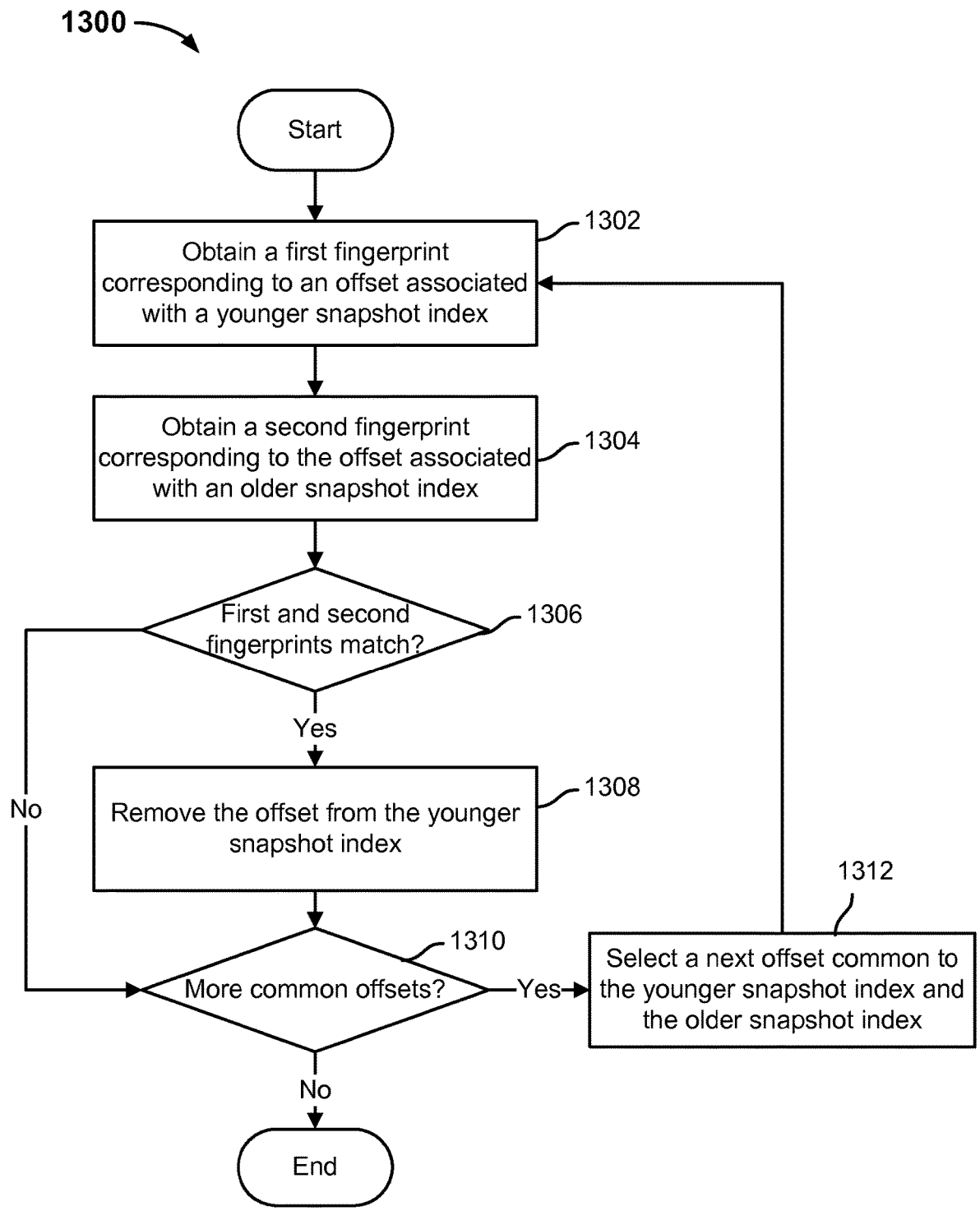
FIG. 13 is a flow diagram showing an example of a process of refactoring a younger snapshot index relative to an older snapshot index.

FIG. 13 is a flow diagram showing an example of a process of refactoring a younger snapshot index relative to an older snapshot index. In some embodiments, process 1300 is implemented at first storage system 602, second storage system 606, or snapshot replication system 608 of system 600 of FIG. 6. In some embodiments, process 1300 is implemented after a selected snapshot has been completely replicated at a destination system. In some embodiments, process 1300 is implemented before a selected snapshot has been completely replicated at a destination system (e.g., process 1300 can be implemented at least partially concurrently to the replication of snapshot data at the destination system).

As described in various examples above, when a snapshot is replicated at a destination system and spliced into an existing snapshot sequence at the destination system, in some embodiments, the younger snapshot index between the replicated snapshot and an adjacent existing snapshot at the destination system is refactored to remove entries. In some embodiments, the replicated snapshot refers to the delta data that is to be or was sent from the source system. The "younger snapshot index" described in process 1300 below refers to the relatively younger snapshot index between the replicated snapshot index and an adjacent existing snapshot index at the destination system and the "older snapshot index" described in process 1300 below refers to the relatively older snapshot index between the replicated snapshot index and an adjacent existing snapshot index at the destination system. Referring back to the example of FIG. 9B, the existing snapshot index at time t3 at the destination was the younger snapshot index that was refactored relative to the replicated snapshot index at time t2. Referring back to the example of FIG. 10B, the replicated snapshot index at time t3 was the younger snapshot index that was refactored relative to the existing snapshot index at time t2 at the destination.

In some embodiments, the replicated snapshot may be refactored with respect to both an adjacent existing older snapshot and an adjacent existing younger snapshot at the destination. Therefore, for example, process 1300 may be applied twice in splicing a snapshot into an existing snapshot sequence at the destination—process 1300 may be applied a first time where the replicated snapshot comprises the "younger snapshot index" and an adjacent existing older snapshot at the destination comprises the "older snapshot index" of process 1300 and process 1300 may be applied a second time where the replicated snapshot comprises the "older snapshot index" and an adjacent existing younger snapshot at the destination comprises the "young snapshot index" of process 1300.

Returning to FIG. 13, at 1302, a first fingerprint corresponding to an offset associated with a younger snapshot index is determined. A fingerprint is determined based on the data value mapped to by a logical offset that is included in the younger snapshot index. In some embodiments, the data value corresponding to the offset is read from the younger snapshot index and the fingerprint of the data value can be determined based on a (e.g., SHA1) hash technique.

At 1304, a second fingerprint corresponding to the offset associated with an older snapshot index is determined. A fingerprint is determined based on the data value mapped to by the same logical offset that is included in the older snapshot index. In some embodiments, the data value corresponding to the offset is read from the older snapshot index. This fingerprint of the data value can be determined based on the same technique that was used to obtain the fingerprint in step 1302.

At 1306, it is determined whether the first fingerprint and the second fingerprint match. In the event that the first fingerprint and the second fingerprint match, the data values pointed to by the same offset in the two snapshot indices are the same (redundant) and control is transferred to 1308. Otherwise, in the event that the first fingerprint and the second fingerprint do not match, the data values pointed to by the same offset in the two snapshot indices are not the same and control is transferred to 1310.

At 1308, the offset is removed from the younger snapshot index. The redundant offset is removed from the younger snapshot index and the underlying data is deleted from the destination system and/or prevented from being transferred from the source system to the destination system.

At 1310, it is determined whether there are more common offsets to the younger snapshot index and the older snapshot index. In the event that there are more common offsets, control is transferred to 1312. Otherwise, in the event that there are no more common offsets, process 1300 ends. At 1312, a next offset common to the younger snapshot index and the old snapshot index is selected.

In various embodiments, a snapshot associated with a clone can be replicated from a source system to a destination system similar to the manner in which a non-clone snapshot can be replicated. As described above, a sequence of snapshots associated with a clone is generated from a snapshot of a set of source data also stored at the source system; the source snapshot is referred to as the "shared snapshot." Because the clone is generated from (and therefore depends on) the shared snapshot of the source data, in various embodiments, a clone snapshot is replicated as a delta of the shared snapshot rather than as an expanded state. As will be described in further detail below, replicating a clone snapshot from a source system to a destination system takes into consideration whether the shared snapshot of the source data is already present at the destination system.

Figure 14:
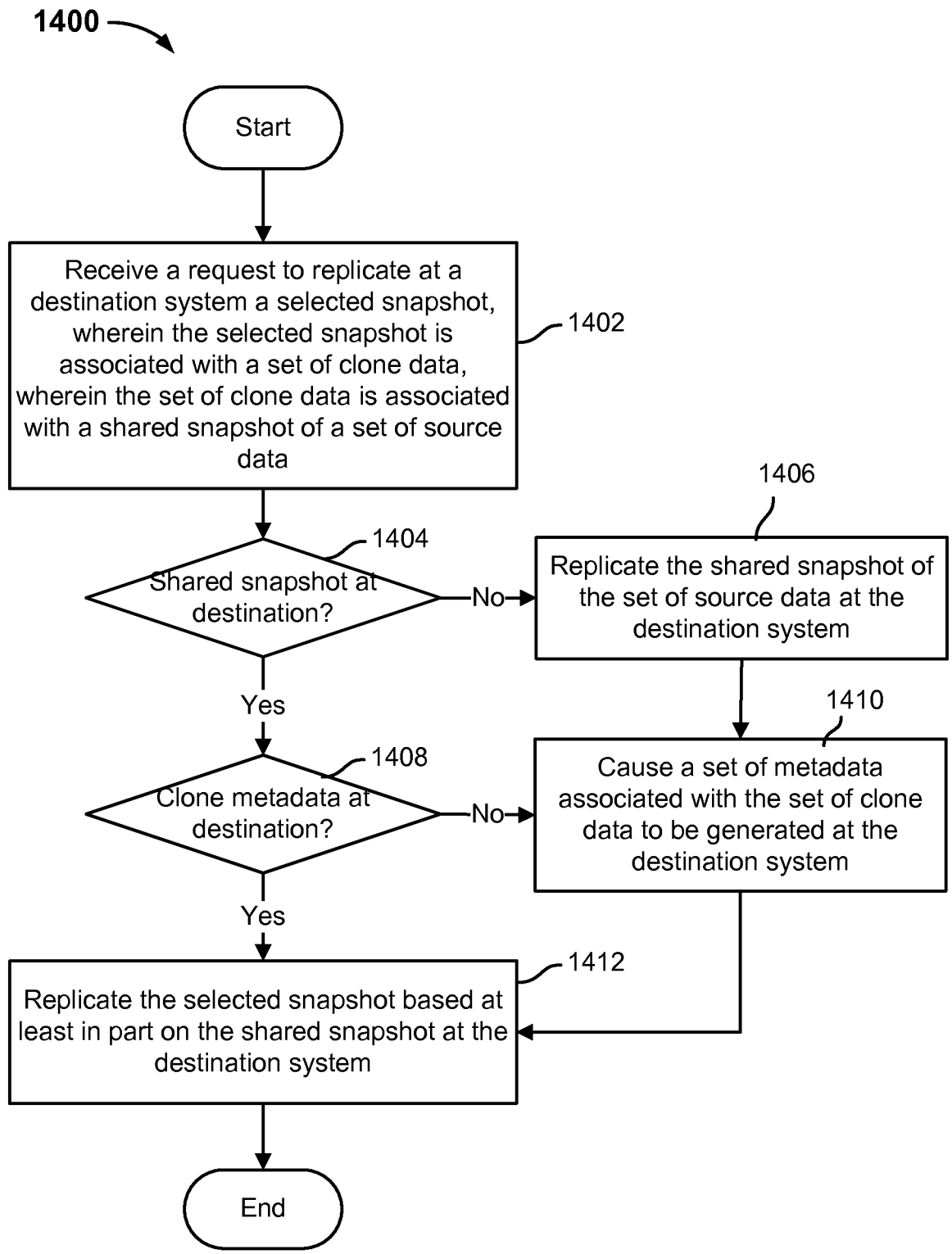
FIG. 14 is a flow diagram showing an embodiment of a process for performing replication of a selected snapshot associated with a clone from a source system to a destination system.

FIG. 14 is a flow diagram showing an embodiment of a process for performing replication of a selected snapshot associated with a clone from a source system to a destination system. In some embodiments, the source system and the destination system of process 1400 can be implemented using first storage system 602 and second storage system 606 of system 600 of FIG. 6, respectively, or second storage system 606 and first storage system 602, respectively. In some embodiments, process 1400 is implemented at first storage system 602, second storage system 606, or snapshot replication system 608 of system 600 of FIG. 6.

At 1402, a request to replicate at a destination system a selected snapshot is received, wherein the selected snapshot is associated with a set of clone data, wherein the set of clone data is associated with a shared snapshot of a set of source data. A snapshot associated with a clone is requested to be replicated at a destination system. A set of metadata stored for the clone can be used to identify which particular shared snapshot of which particular source data is the shared snapshot from which the clone was generated. For example, the shared snapshot and its associated source data may be identified by a snapshot global ID, which indicates the system that created the snapshot, the expanded state associated with the snapshot, and also the set of data (e.g., vdisks or files) with which the snapshot is associated.

At 1404, it is determined whether the shared snapshot of the set of source data already exists at the destination system. It is determined whether the shared snapshot from which the clone was generated is already present at the destination system. For example, whether the shared snapshot of the source data is already present at the destination system can be determined from the stored identifying information as described above. For example, it can be determined from the stored identifying information whether the destination system currently stores a snapshot associated with the snapshot global ID of the shared snapshot. In the event that the shared snapshot does not already exist at the destination system, control is transferred to 1406. Otherwise, in the event that the shared snapshot already exists at the destination system, control is transferred to 1408.

At 1406, the shared snapshot of the set of source data is replicated at the destination system. If the shared snapshot of the source data is not already present at the destination system, then the shared snapshot is first replicated at the destination system. In some embodiments, a process such as process 800 of FIG. 8 is used to replicate the shared snapshot from the source system to the destination system. For example, the shared snapshot can be replicated as a delta of an existing snapshot (at either the source system or the destination system). The shared snapshot may also be subsequently reused for other replicated clones that link to the shared snapshot.

In some cases, a shared snapshot that is only used by a single clone may be automatically deleted and merged with the next younger snapshot of the clone to save space. Information about the deleted base of the clone is, however, retained by the clone.

At 1408, it is determined whether the set of metadata associated with the set of clone data already exists at the destination system. In the event that the set of metadata associated with the set of clone data does not already exist at the destination system, control is transferred to 1410. Otherwise, in the event that the shared snapshot already exists at the destination system, control is transferred to 1412.

At 1410, a set of metadata associated with the set of clone data is caused to be generated at the destination system. If the clone does not already exist at the destination, then the clone is generated at the destination by at least generating a set of metadata associated with the clone. For example, the set of metadata associated with the clone may include a set of file global IDs associated with the clone, data linking the clone to the shared snapshot at the destination system, and/or a current snapshot index associated with the clone to use to create subsequent snapshots associated with the clone. In particular, the file global IDs associated with the clone can be used to identify which snapshots belong to the clone and which do not (e.g., snapshots that belong to the source data from which the clone was generated).

At 1412, the selected snapshot is replicated based at least in part on the shared snapshot at the destination system. Once it is determined that the shared snapshot and the clone metadata are present at the destination system, the selected clone snapshot can be replicated to the destination system. In some embodiments, a process such as process 800 of FIG. 8 is used to replicate the selected clone snapshot from the source system to the destination system. For example, the selected clone snapshot can be replicated as a delta of another snapshot (e.g., the shared snapshot).

Figure 15A:
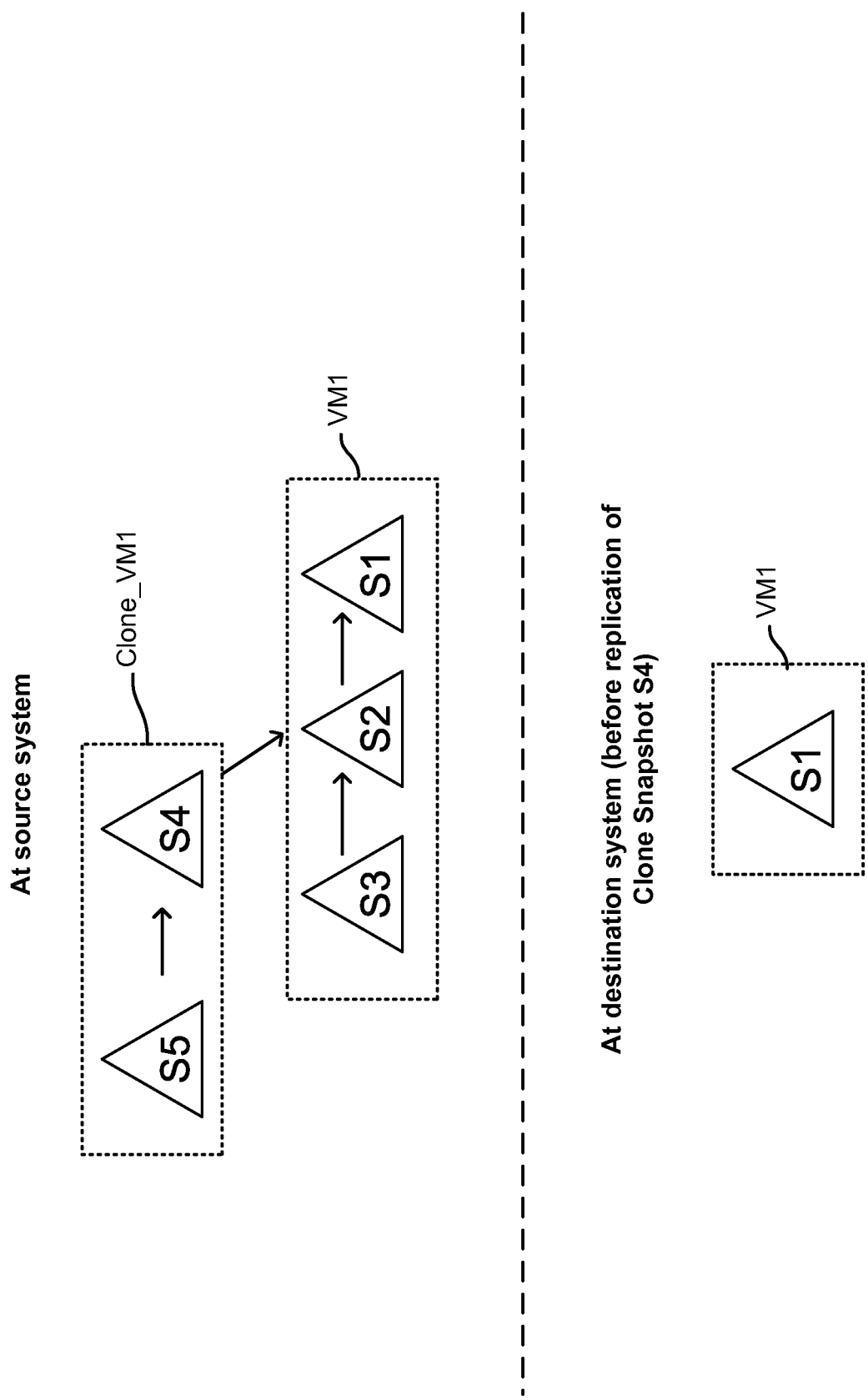
Figure 15C:
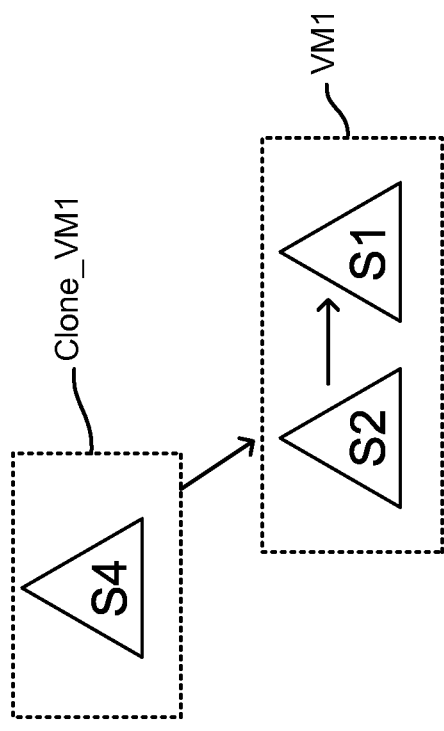

FIGS. 15A, 15B, and 15C are diagrams showing an example of replicating a snapshot at time t4 (S4) associated with a clone from a source system to a destination system. As shown in FIG. 15A, the source system includes two snapshot sequences. The first snapshot sequence at the source system is associated with a set of source data with the file global ID of "VM1" and comprises the snapshot at time t3 (S3), the snapshot at time t2 (S2), and the snapshot at time t1 (S1). The second snapshot sequence at the source system is associated with a clone with the file global ID of "Clone_VM1" and comprises the snapshot at time t5 (S5) and the snapshot at time t4 (S4). "Clone_VM1" was generated from (and therefore depends on) the snapshot at time t2 (S2) of "VM1." Therefore, the snapshot at time t2 (S2) is the shared snapshot associated with the snapshot sequence of "Clone_VM1." Also, as shown in FIG. 15A, the snapshot sequence at the destination system, prior to the snapshot at time t4 (S4) being replicated, includes the snapshot at time t1 (S1) associated with file global ID "VM1." Because the shared snapshot, the snapshot at time t2 (S2), is not present at the destination system, the snapshot at time t2 (S2) will be replicated at the destination system first.

The shared snapshot, the snapshot at time t2 (S2), can be replicated at the destination system by sending the delta of the snapshot at time t2 (S2) relative to the snapshot at time t1 (S1) to the destination system, for example. FIG. 15B shows the result of replicating the snapshot at time t2 (S2) at the destination system, which includes splicing the snapshot at time t2 (S2) to point to the snapshot at time t1 (S1) in a snapshot sequence associated with "VM1."

After the shared snapshot, the snapshot at time t2 (S2), is replicated at the destination system, the metadata of clone "Clone_VM1" is generated at the destination system. FIG. 15B shows the result of generating the metadata associated with clone "Clone_VM1" at the destination system as a box with dotted lines labeled "Clone_VM1" and that links to the snapshot at time t2 (S2) of the snapshot sequence associated with "VM1."

After the metadata of clone "Clone_VM1" is generated at the destination system, the snapshot at time t4 associated with "Clone_VM1" is replicated at the destination system. The snapshot at time t4 (S4) can be replicated at the destination system in a manner similar to replicating a non-clone snapshot. The snapshot at time t4 (S4) can be replicated at the destination system by sending the delta of the snapshot at time t4 (S4) relative to the shared snapshot, the snapshot at time t2 (S2), to the destination system, for example. FIG. 15C shows the result of replicating the snapshot at time t4 (S4) at the destination system, which includes associating the snapshot at time t4 (S4) with file global ID "Clone_VM1" and splicing the snapshot at time t4 (S4) to point to the snapshot at time t2 (S2) in a snapshot sequence associated with "VM1."

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to replicate snapshots between storage systems, comprising:
a processor configured to:
receive a request to store at a destination system a snapshot data to represent at the destination system a state of a set of data associated with a virtual machine at a first point-in-time, wherein a first source system snapshot data that represents at a source system the state of the set of data at the first point-in-time depends on a second source system snapshot data that represents at the source system a state of the set of data at a second point-in-time and the snapshot indicates a physical storage location of the set of data;
use stored snapshot age identifying information to determine a set of delta data to be sent from the source system to the destination system including by selecting at least a younger snapshot based at least in part on an order among the first source system snapshot data, the second source system snapshot data, and a first destination system snapshot data that represents at the destination system a state of the set of data at a third point-in-time determined from the snapshot age identifying information, wherein selecting the younger snapshot forms a smaller delta compared with an older snapshot to consume less bandwidth when transmitting the set of delta data, wherein the snapshot age identifying information includes value data associated with a time of creation of the snapshot;

generate a new destination system snapshot data that represents at the destination system the state of the set of data at the first point-in-time to be inserted into a sequence of snapshot data stored at the destination system based at least in part on the set of delta data, including to:

determine a redundant metadata entry that is included in both the set of delta data and a second destination system snapshot data included in the sequence of snapshot data stored at the destination system; and remove the redundant metadata entry from either the set of delta data or the second destination system snapshot data; and transmit the generated new destination system snapshot data to the destination system; and a memory coupled to the processor and configured to store the request.

2. The system of claim 1, wherein each of the first source system snapshot data and the second source system snapshot data is included in a sequence of snapshot data stored at the source system.

3. The system of claim 1, wherein the processor is configured to insert the new destination system snapshot data into the sequence of snapshot data stored at the destination system.

4. The system of claim 1, wherein the set of delta data to be sent from the source system to the destination system is determined based at least in part on the first source system snapshot data and the second source system snapshot data.

5. The system of claim 1, wherein the processor is further configured to cause the new destination system snapshot data to depend on the first destination system snapshot data.

6. The system of claim 5, wherein the second destination system snapshot data represents at the destination system a state of the set of data at a fourth point-in-time, wherein the first point-in-time is earlier than the fourth point-in-time and wherein to generate the new destination system snapshot data includes to:

remove the redundant metadata entry from the second destination system snapshot data.

7. The system of claim 5, wherein the third point-in-time is earlier than the first point-in-time and wherein to generate the new destination system snapshot data includes to:

remove the redundant metadata entry from the set of delta data.

8. The system of claim 7, wherein further in response to the determination that the redundant metadata entry is included in both the set of delta data and the second destination system snapshot data included in the sequence of snapshot data stored at the destination system, preventing the redundant metadata entry associated with the set of delta data from being sent from the source system to the destination system.

9. The system of claim 5, wherein the new destination system snapshot data is inserted into the sequence of snapshot data stored at the destination system based at least in part on the first point-in-time and the third point-in-time.

10. The system of claim 1, wherein the set of delta data comprises a first snapshot data, wherein the processor is further configured to determine a second snapshot data to represent at the source system a state of the set of data at a desired point-in-time, wherein the second snapshot data is determined based at least in part on a third destination system snapshot data that represents at the destination system the state of the set of data at the desired point-in-time.

11. The system of claim 1, wherein the second point-in-time is earlier than the first point-in-time and is the same as the third point-in-time.

12. The system of claim 1, wherein the second point-in-time is earlier than the first point-in-time and wherein the third point-in-time is earlier than the first point-in-time but later than the second point-in-time.

13. The system of claim 1, wherein the set of data comprises a set of clone data generated from a third source system snapshot data that represents at the source system a state of a set of source data at a fourth point-in-time, wherein the second source system snapshot data associated with the set of clone data depends on the third source system snapshot data associated with the set of source data.

14. The system of claim 13, wherein the processor is configured to:

merge one or more metadata entries included in a third source system snapshot data associated with the source set of data into the second source system snapshot data associated with the set of clone data; and delete the third source system snapshot data associated with the source set of data.

15. The system of claim 1, wherein the value data includes ordinal data such that a younger snapshot has a different value for the identifying information than an older snapshot.

16. The system of claim 1, wherein the value data includes a counter and a value of the counter is determined as the time of snapshot creation such that a younger snapshot has a larger value than an older snapshot.

17. A method to replicate snapshots between storage systems, comprising:

receiving a request to store at a destination system a snapshot data to represent at the destination system a state of a set of data associated with a virtual machine at a first point-in-time, wherein a first source system snapshot data that represents at a source system the state of the set of data at the first point-in-time depends on a second source system snapshot data that represents at the source system a state of the set of data at a second point-in-time and the snapshot indicates a physical storage location of the set of data;

using stored snapshot age identifying information to determine a set of delta data to be sent from the source system to the destination system including by selecting at least a younger snapshot based at least in part on an order among the first source system snapshot data, the second source system snapshot data, and a first destination system snapshot data that represents at the destination system a state of the set of data at a third point-in-time determined from the snapshot age identifying information, wherein selecting the younger snapshot forms a smaller delta compared with an older snapshot to consume less bandwidth when transmitting the set of delta data, wherein the snapshot age identifying information includes value data associated with a time of creation of the snapshot;

generating a new destination system snapshot data that represents at the destination system the state of the set of data at the first point-in-time to be inserted into a sequence of snapshot data stored at the destination system based at least in part on the set of delta data, including by:

determining a redundant metadata entry that is included in both the set of delta data and a second destination system snapshot data included in the sequence of snapshot data stored at the destination system; and removing the redundant metadata entry from either the set of delta data or the second destination system snapshot data; and transmitting the generated new destination system snapshot data to the destination system.

18. The method of claim 17, further comprising inserting the new destination system snapshot data into the sequence of snapshot data stored at the destination system.

19. The method of claim 17, wherein each of the first source system snapshot data and the second source system snapshot data is included in a sequence of snapshot data associated at the source system.

20. The method of claim 17, wherein the set of delta data is determined based at least in part on the first source system snapshot data and the second source system snapshot data.

21. The method of claim 17,
further comprising causing the new destination system snapshot data to depend on the first destination system snapshot data.

22. The method of claim 21, wherein the new destination system snapshot data is inserted into the sequence of snapshot data stored at the destination system based at least in part on the first point-in-time and the third point-in-time.

23. The method of claim 17, wherein the set of delta data comprises a first snapshot data, further comprising determining a second snapshot data to represent at the source system a state of the set of data at a desired point-in-time, wherein the second snapshot data is determined based at least in part on a third destination system snapshot data that represents at the destination system the state of the set of data at the desired point-in-time.

24. The method of claim 17, wherein the set of data comprises a set of clone data generated from a third source system snapshot data that represents at the source system a state of a set of source data at a fourth point-in-time, wherein the second source system snapshot data associated with the set of clone data depends on the third source system snapshot data associated with the set of source data.

25. A computer program product to replicate snapshots between storage systems, the computer program product being embodied in a non-transitory computer readable storage medium and comprising computer instructions for:

receiving a request to store at a destination system a snapshot data to represent at the destination system a state of a set of data associated with a virtual machine at a first point-in-time, wherein a first source system snapshot data that represents at a source system the state of the set of data at the first point-in-time depends on a second source system snapshot data that represents at the source system a state of the set of data at a second point-in-time and the snapshot indicates a physical storage location of the set of data;

using stored snapshot age identifying information to determine a set of delta data to be sent from the source system to the destination system including by selecting at least a younger snapshot based at least in part on an order among the first source system snapshot data, the second source system snapshot data, and a first destination system snapshot data that represents at the destination system a state of the set of data at a third point-in-time determined from the snapshot age identifying information, wherein selecting the younger snapshot forms a smaller delta compared with an older snapshot to consume less bandwidth when transmitting the set of delta data, wherein the snapshot age identifying information includes value data associated with a time of creation of the snapshot;

generating a new destination system snapshot data that represents at the destination system the state of the set of data at the first point-in-time to be inserted into a sequence of snapshot data stored at the destination system based at least in part on the set of delta data, including by:

determining a redundant metadata entry that is included in both the set of delta data and a second destination system snapshot data included in the sequence of snapshot data stored at the destination system; and removing the redundant metadata entry from either the set of delta data or the second destination system snapshot data; and transmitting the generated new destination system snapshot data to the destination system.

* * * * *

UNITED STATES PATENT AND TRADEMARK OFFICE
CERTIFICATE OF CORRECTION

PATENT NO. : 10,628,378 B2
APPLICATION NO. : 14/472834
DATED : April 21, 2020
INVENTOR(S) : Shobhit Dayal, Gideon W. Glass and Edward K. Lee It is certified that error appears in the above-identified patent and that said Letters Patent is hereby corrected as shown below:

On the Title Page

In page 2, Column 1, item (56), U.S. patent documents, cite no. 7, delete "Armangau" and insert --ARMANGAU et al.--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*